(12) United States Patent
Gao et al.

(10) Patent No.: US 11,310,081 B2
(45) Date of Patent: Apr. 19, 2022

(54) PACKET TRANSMISSION METHOD AND APPARATUS

(71) Applicant: Huawei Technologies Co., Ltd., Shenzhen (CN)

(72) Inventors: Jun Gao, Shenzhen (CN); Yuan Gao, Nanjing (CN); Wanmei Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/093,207

(22) Filed: Nov. 9, 2020

(65) Prior Publication Data

US 2021/0194731 A1 Jun. 24, 2021

Related U.S. Application Data

(63) Continuation of application No. PCT/CN2019/085849, filed on May 7, 2019.

(30) Foreign Application Priority Data

May 10, 2018 (CN) .......................... 201810443754.2

(51) Int. Cl.
*H04L 12/46* (2006.01)
*H04L 45/74* (2022.01)
(52) U.S. Cl.
CPC ...... *H04L 12/4675* (2013.01); *H04L 12/4633* (2013.01); *H04L 45/74* (2013.01)
(58) Field of Classification Search
None
See application file for complete search history.

(56) References Cited

U.S. PATENT DOCUMENTS

2015/0016300 A1   1/2015  Devireddy et al.
2019/0028424 A1*  1/2019  Mittal ................... H04L 61/103
2019/0132278 A1*  5/2019  Mittal ................... H04L 61/1552

FOREIGN PATENT DOCUMENTS

CN    103957160 A    7/2014
CN    105099950 A   11/2015
(Continued)

OTHER PUBLICATIONS

Sajassi, A., et al., "A Network Virtualization Overlay Solution using EVPN", draft-ietf-bess-evpn-overlay-07, IETF, Dec. 1, 2016, 28 pages.
(Continued)

*Primary Examiner* — Christine T Duong
(74) *Attorney, Agent, or Firm* — Slater Matsil, LLP

(57) ABSTRACT

This application provides a packet transmission method and apparatus. The method includes: receiving, by a first transmission device, a first VXLAN packet sent by a first service device through a first virtual extensible local area network VXLAN tunnel; determining, by the first transmission device, first egress information corresponding to a first BD and a first destination media access control MAC address, based on a correspondence between the first BD, the first destination MAC address, and the first egress information; generating, by the first transmission device, a second VXLAN packet based on the first VXLAN packet and the first egress information, where the second VXLAN packet includes a second VNI and an Ethernet frame; and sending, by the first transmission device sends the second VXLAN packet to a second transmission device through a second VXLAN tunnel. This application facilitates more flexible packet transmission.

20 Claims, 13 Drawing Sheets

(56) References Cited

FOREIGN PATENT DOCUMENTS

| | | |
|---|---|---|
| CN | 106209553 A | 12/2016 |
| CN | 106878136 A | 6/2017 |
| CN | 107342925 A | 11/2017 |
| CN | 107645433 A | 1/2018 |
| WO | 2014210483 A1 | 12/2014 |
| WO | 2017214883 A1 | 12/2017 |

OTHER PUBLICATIONS

Wenzhi, Bai et al., "Discussion on Cross Domain Distributed Cloud Data Center Construction Solution", China Information Technology Designing and Consulting Institute Co. Ltd., Oct. 2017, total 6 pages. With an English Abstract.

* cited by examiner

PACKET TRANSMISSION METHOD AND APPARATUS

CROSS-REFERENCE TO RELATED APPLICATIONS

This application claims the benefit of International Application No. PCT/CN2019/085849, filed on May 7, 2019, which claims priority to Chinese Patent Application No. 201810443754.2, filed on May 10, 2018, all of which applications are hereby incorporated herein by reference.

TECHNICAL FIELD

This application relates to the field of communications technologies, and more specifically, to a packet transmission method and apparatus.

BACKGROUND

Virtual extensible local area network (VXLAN) is a technology that encapsulates a layer 2 packet by using a layer 3 protocol. An Ethernet frame based on a media access control (MAC) protocol is encapsulated by the VXLAN in a user datagram protocol (UDP) packet. Further, the UDP packet is encapsulated in an internet protocol (Internet Protocol, IP) packet, and the IP packet may be transmitted in a layer 3 network. Therefore, the Ethernet frame is transmitted in the layer 3 network. A VXLAN network identifier (VNI) is used to identify a VXLAN segment in the VXLAN technology. Different VXLAN segments respectively correspond to different VNIs. Different VXLAN segments are isolated from each other. When two virtual machines (VM) with a same VNI communicate with each other, a VXLAN layer 3 gateway is not required. When two VMs with different VNIs communicate with each other, a VXLAN layer 3 gateway is required. A VNI field includes 24 Bits. A management domain may include a maximum of 216 VXLAN segments. A virtual extensible local area network tunnel end point (VTEP) may be integrated into a network virtualization edge (NVE) device, and is used as an edge device in the VXLAN. The NVE device transmits traffic of the VXLAN through a VXLAN tunnel. The VXLAN tunnel is a point-to-point logical tunnel between two NVE devices.

In an actual scenario, to implement communication between network devices in different data centers, an end-to-end VXLAN tunnel may be established between the network devices in the different data centers, and network devices in two data centers may transmit a VXLAN packet by using the end-to-end VXLAN tunnel. However, the solution requires protocols and VXLAN encapsulation information that are used in the two data centers to be identical, and unified VXLAN tunnel planning is also required. The different data centers need to generate VXLAN packets based on the unified planning and a requirement. Consequently, the VXLAN packets cannot be flexibly transmitted between the different data centers.

SUMMARY

This application provides a packet transmission method and apparatus. A VXLAN tunnel is established between network devices at edges of different data centers and each of the different data centers independently plans the VXLAN tunnel, to form segment VXLAN tunnels of the different data centers. This facilitates more flexible packet transmission.

According to a first aspect, a packet transmission method is provided. The method includes: receiving, by a first transmission device, a first VXLAN packet sent by a first service device through a first VXLAN tunnel, where the first VXLAN packet includes a first VXLAN network identifier VNI, and the first VNI indicates that a broadcast domain (BD) to which the first VXLAN packet sent by the first service device through the first VXLAN tunnel belongs is a first BD; determining, by the first transmission device, first egress information corresponding to the first BD and a first destination MAC address, based on a correspondence between the first BD, the first destination MAC address, and the first egress information, where the first destination MAC address indicates a destination address of an Ethernet frame includes in the first VXLAN packet, and the first egress information includes a first virtual extensible local area network tunnel end point VTEP address and a second VNI; generating, by the first transmission device, a second VXLAN packet based on the first VXLAN packet and the first egress information, where the second VXLAN packet includes the second VNI and the Ethernet frame; and sending, by the first transmission device, the second VXLAN packet to a second transmission device through a second VXLAN tunnel, where the first VTEP address indicates a port through which the second transmission device connects to the second VXLAN tunnel, and the second VNI indicates that a BD to which the second VXLAN packet sent by the first transmission device through the second VXLAN tunnel belongs is a second BD.

The first transmission device and the first service device are located in a first data center (DC), and the second transmission device is located in a second DC. The second DC is different from the first DC. Further, the first transmission device may be a device located at an edge of the first DC, and the second transmission device may be a device located at an edge of the second DC.

It should be understood that the first VXLAN tunnel and the second VXLAN tunnel are different VXLAN tunnels. Different VNIs correspond to different BDs. The VNIs and the BDs are in a one-to-one correspondence.

In addition, the first VTEP address may be an IP address of a physical interface or a loopback interface on the second transmission device.

Optionally, the first VXLAN packet is a VXLAN packet generated by the first service device based on a first data packet after the first service device receives the first data packet from a first virtual device.

It should be understood that an Ethernet frame included in the first data packet is the same as the Ethernet frame included in the first VXLAN packet, and the first VXLAN packet may be obtained by reencapsulating the first data packet. A first VXLAN packet including a first VNI identifier may be obtained by adding the first VNI identifier to the first data packet.

In this application, a VXLAN tunnel is established between network devices at edges of different data centers, so that each data center can independently plan the VXLAN tunnel, to form segment VXLAN tunnels of the different data centers. This facilitates more flexible packet transmission.

Further, because the VXLAN tunnel between the devices in the different data centers is established segment by segment, the different data centers may separately configure their own VXLAN tunnel, and independently plan their own VNI spaces, so that network maintenance can be simplified.

In some implementations, the second VNI is the same as a third VNI.

In some implementations, the second VNI is different from the third VNI.

The third VNI is a VNI included in a third VXLAN packet sent by the second transmission device to a second service device through a third VXLAN tunnel. The third VXLAN packet is generated by the second transmission device based on the second VXLAN packet. The second transmission device and the second service device are located in the second DC.

When the second VNI is the same as the third VNI, only one VNI needs to be allocated to each BD, and configuration and implementation of the VNI are relatively simple.

When the second VNI is different from the third VNI, VXLAN packet traffic within a DC can be decoupled from VXLAN packet traffic outside the DC. Therefore, traffic on different VXLAN tunnels can be easily monitored.

If the second VNI is the same as the third VNI, VNIs carried in traffic received by a transmission device inside and outside of the data center may be the same. In this case, the transmission device cannot distinguish a traffic type based on the VNIs. Therefore, independent VNI planning between the data centers facilitates monitoring of traffic received inside and outside of the data center.

The first transmission device and the second transmission device may be respectively referred to as a first transmission node and a second transmission node, and the first service device and the second service device may be respectively referred to as a first service node and a second service node.

In some implementations, the method further includes: receiving, by the first transmission device, a first MAC/IP advertisement route sent by the second transmission device, where the first MAC/IP advertisement route includes the first destination MAC address and the second VNI; and generating, by the first transmission device, the correspondence between the first BD, the first destination MAC address, and the first egress information based on the first MAC/IP advertisement route.

It should be understood that, the first transmission device may receive, before receiving the first VXLAN packet, the first MAC/IP advertisement route sent by the second transmission device, and then determine the first egress information corresponding to the first BD and the first destination MAC address based on the correspondence that is between the first BD, the first destination MAC address, and the first egress information and that is extracted from the first MAC/IP advertisement route. Further, the first transmission device generates the second VXLAN packet based on the first VXLAN packet and the first egress information.

MAC learning in a control plane makes MAC learning more flexible, reliable, and controllable.

Further, by receiving a MAC/IP advertisement route sent by an adjacent device, a correspondence between a BD, a destination MAC address, and egress information may be extracted from the MAC/IP advertisement route, so that the egress information may be determined subsequently based on the extracted correspondence between the BD, the destination MAC address, and the egress information, to facilitate encapsulation of a VXLAN packet.

In some implementations, the method further includes: sending, by the first transmission device, a second MAC/IP advertisement route to the first service device, where the second MAC/IP advertisement route includes the first destination MAC address and the first VNI.

By sending the MAC/IP advertisement route to the adjacent device, the adjacent device extracts the correspondence between the BD, the destination MAC address, and the egress information from the MAC/IP advertisement route, so that the adjacent device subsequently determines the egress information based on the extracted correspondence between the BD, the destination MAC address, and the egress information, to facilitate encapsulation of a VXLAN packet.

It should be understood that the first transmission device may send the second MAC/IP advertisement route to the first service device before receiving the first VXLAN packet sent by the first service device. After obtaining the second MAC/IP advertisement route, if the first service device receives the first data packet from the first virtual device in the first DC, the first service device may encapsulate the first data packet based on information obtained through the second MAC/IP advertisement route, to generate the first VXLAN packet.

For explanations of the first MAC/IP advertisement route and the second MAC/IP advertisement route, refer to a description of MAC/IP advertisement route in section 7.2 of request for comments (RFC) 7432 in the internet engineering task force (IETF).

In some implementations, the method further includes: receiving, by the first transmission device, a first route that is sent by the first service device and that is reflected by a first route reflector (RR) and that is used to establish the first VXLAN tunnel, where the first RR is located in the first DC; adding, by the first transmission device, the first VXLAN tunnel to a first split horizon group, where the first split horizon group is a split horizon group in the first DC; receiving, by the first transmission device, a second route that is sent by the second transmission device and that is reflected by a second RR and that is used to establish the second VXLAN tunnel, where the second RR is located outside the first DC; and adding, by the first transmission device, the second VXLAN tunnel to a second split horizon group, where the second split horizon group is a split horizon group outside the first DC.

It should be understood that when sending a VXLAN packet, a transmission device sends the VXLAN packet only to a device in another split horizon group other than the split horizon group in which the transmission device is located, and does not send the packet to a device in the split horizon group. This can ensure that the VXLAN packet is transmitted to a target device.

It should be further understood that the split horizon group may be implemented in a specified static manner.

The first RR may be an independent device in the first DC, or may be disposed on a device in the first DC. Similarly, the second RR may be an independent device outside the first DC, or may be disposed on a transmission device outside the first DC.

In addition, the first route and the second route may be inclusive multicast Ethernet tag (IMET) routes. For an explanation of an inclusive multicast Ethernet tag route, refer to a description of the inclusive multicast Ethernet tag route in section 7.3 of RFC7432.

In some implementations, the method further includes: determining, by the first transmission device based on the first VTEP address, that the second transmission device is located in the second DC.

In this application, the first transmission device may determine, based on a VTEP address extracted from the egress information, a DC in which a device at a VXLAN packet receive end is located, and send the VXLAN packet to the device when the VXLAN packet receive end device is located outside the DC in which the transmission device is located. This ensures that an Ethernet frame carried in the VXLAN packet is finally transmitted to the target device.

According to a second aspect, a packet transmission apparatus is provided. The apparatus includes a module configured to perform the method in the first aspect.

According to a third aspect, a packet transmission apparatus is provided. The apparatus includes a memory, a transceiver, and a processor. The memory is configured to store a program, and the processor is configured to execute the program stored in the memory. When the program stored in the memory is executed by the processor, the transceiver and the processor are configured to perform the method in any implementation of the first aspect.

According to a fourth aspect, a computer-readable storage medium is provided. The computer-readable storage medium stores an instruction. When the instruction is run on a computer, the computer is enabled to perform the method described in the first aspect.

According to a fifth aspect, a computer program product including an instruction is provided. When the instruction is run on a computer, the computer is enabled to perform the method described in the first aspect.

The computer may be a network device in a data center, for example, a service device or a transmission device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following describes the technical solutions in this application in detail with reference to the accompanying drawings.

A packet transmission method in the embodiments of this application mainly focuses on VXLAN packet transmission. To better understand the packet transmission method in the embodiments of this application, the following first describes a VXLAN packet format in detail with reference to FIG. 1.

Figure 1:
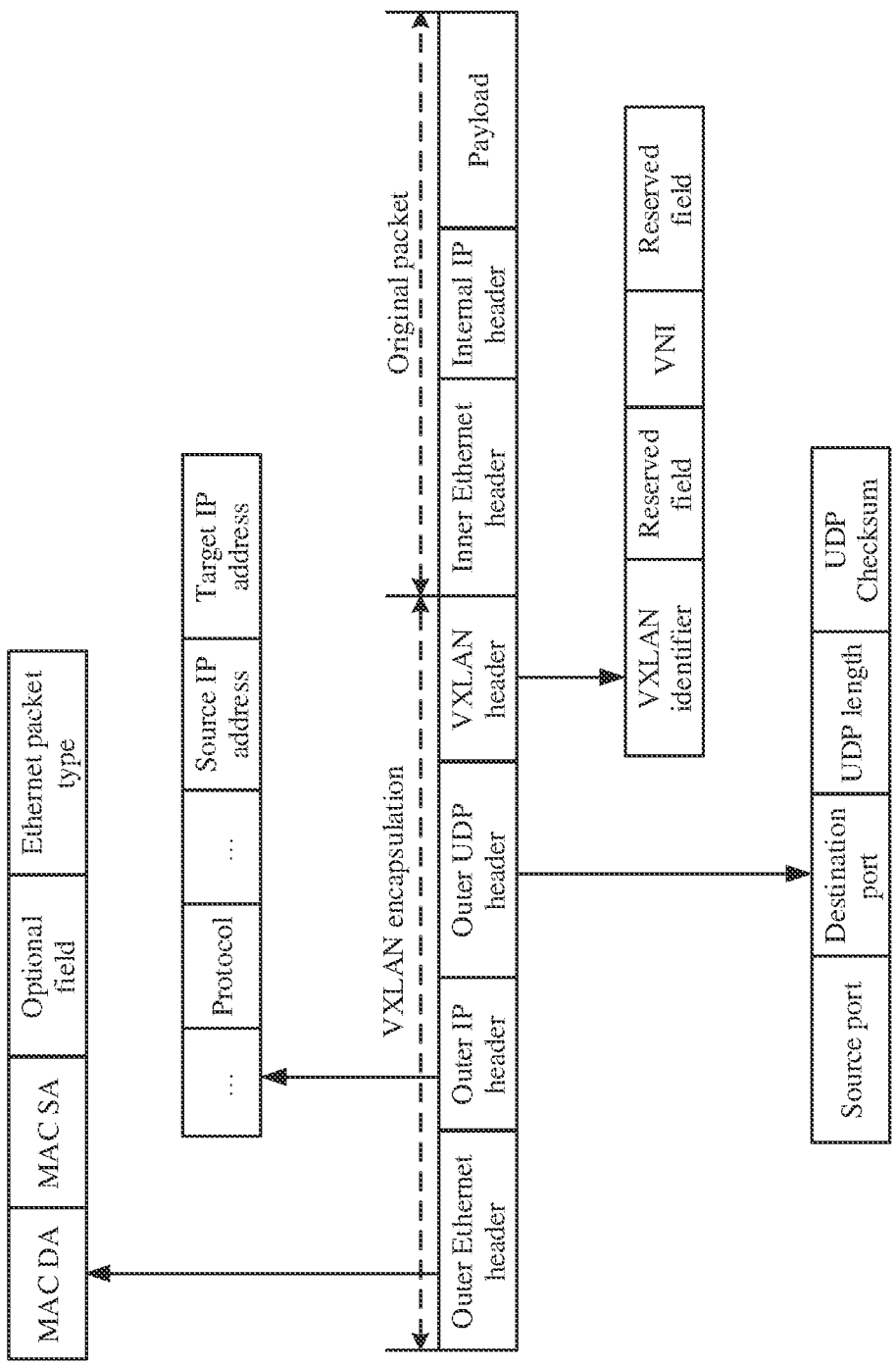
FIG. 1 is a schematic diagram of a VXLAN packet format.

A VXLAN packet is a packet in which UDP encapsulation and VXLAN header encapsulation are added to an original Ethernet packet. FIG. 1 shows a specific packet format. The VXLAN packet includes two parts: an original packet and VXLAN encapsulation. The original packet includes an inner Ethernet header, an inner IP header, and a payload. The VXLAN encapsulation includes an outer Ethernet header, an outer IP header, an outer UDP header, and a VXLAN header.

The VXLAN header includes a VXLAN flag, a VNI, and two reserved fields. The VXLAN flag occupies 8 bits, and a value of the VXLAN flag is 00001000. The VNI is a VXLAN network identifier, occupies 24 bits, and is used to distinguish different VXLAN fields. The two reserved fields occupy 24 bits and 8 bits respectively and must be set to 0.

The outer UDP header includes a source port, a destination port, a UDP length, and a UDP checksum. A destination UDP port number is 4789. A source port number is calculated using a hash algorithm based on an inner packet.

The outer IP header includes a protocol, a source IP address (IP SA), a destination IP address (IP DA), and another field. The source IP address is an IP address of a local VTEP of a VXLAN tunnel. The destination IP address is an IP address of a remote VTEP of the VXLAN tunnel.

The outer Ethernet header includes a MAC DA, a MAC SA, an optional field (802.1Q Tag), and an Ethernet packet type (Ethernet type). The MAC DA indicates a MAC address corresponding to a next-hop IP address in a routing table. The routing table is found, based on a destination VTEP address, on a VTEP to which a virtual machine sending a packet belongs. The MAC SA indicates a MAC address of the VTEP to which the virtual machine sending the packet belongs. The optional field is a VLAN identifier carried in the packet.

To implement communication between network devices in different data centers, in a conventional solution, an end-to-end VXLAN tunnel is established between the network devices in the different data centers. A specific form of the VXLAN tunnel established in the conventional solution is described below with reference to FIG. 2.

Figure 2:
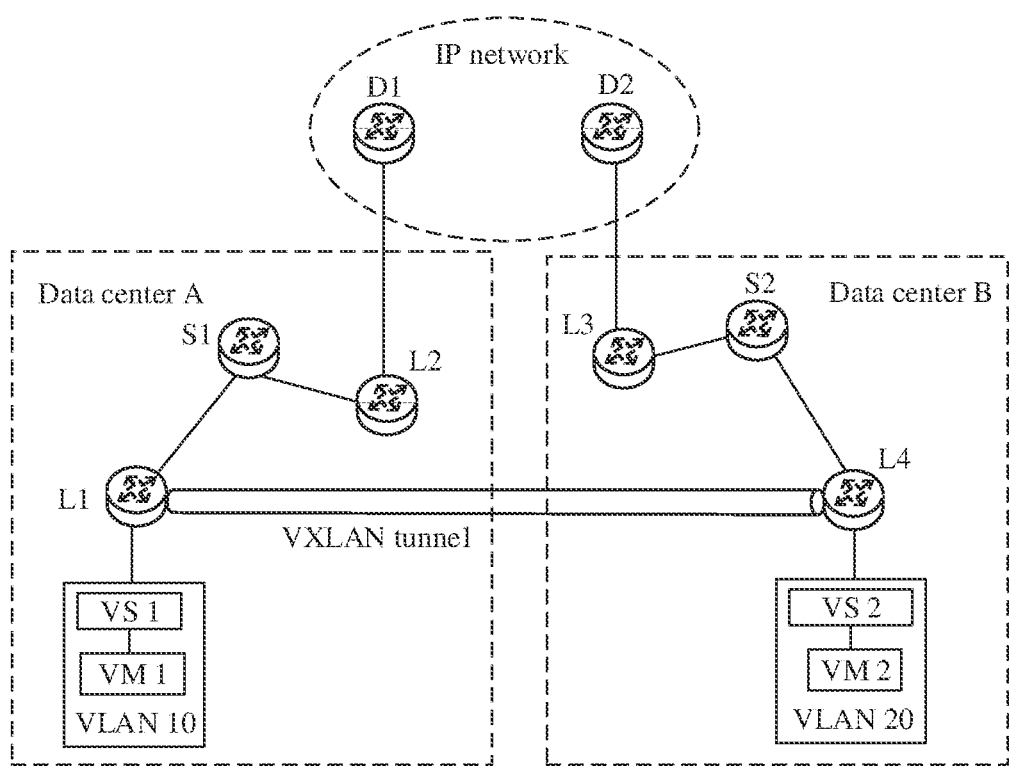
FIG. 2 is a schematic diagram of an end-to-end VXLAN tunnel established between a data center A and a data center B in a conventional solution.

As shown in FIG. 2, an end-to-end VXLAN tunnel is established between an L1 device in a data center A and an L4 device in a data center B. After receiving a data packet, the L1 device may reencapsulate the data packet to obtain a VXLAN packet, and transmit the VXLAN packet to the L4 device in the data center B through another device and an IP network. To ensure that the VXLAN packet can be normally transmitted between the L1 device and the L4 device, protocols and VXLAN encapsulation information used in the data center A and the data center B need to be identical, and the VXLAN tunnel between the data center A and the data center B needs to be centrally planned. For example, MAC address information and VNI information of tenants in the data center A and the data center B need to be centrally planned.

In addition, when there are a plurality of service devices in the data center A and the data center B, to transmit the VXLAN packet between a service device in the data center A and a service device in the data center B, a plurality of end-to-end VXLAN tunnels need to be established between the service device in the data center A and the service device in the data center B. This greatly increases complexity of network configuration for the data center A and the data center B.

Therefore, this application provides a new solution. A VXLAN tunnel is established between network devices at edges of different data centers. Each of the different data centers independently plans its own VXLAN tunnel, to obtain VXLAN tunnels of the different data centers. Consequently, network planning complexity is simplified and a packet can be transmitted more flexibly.

Figure 3:
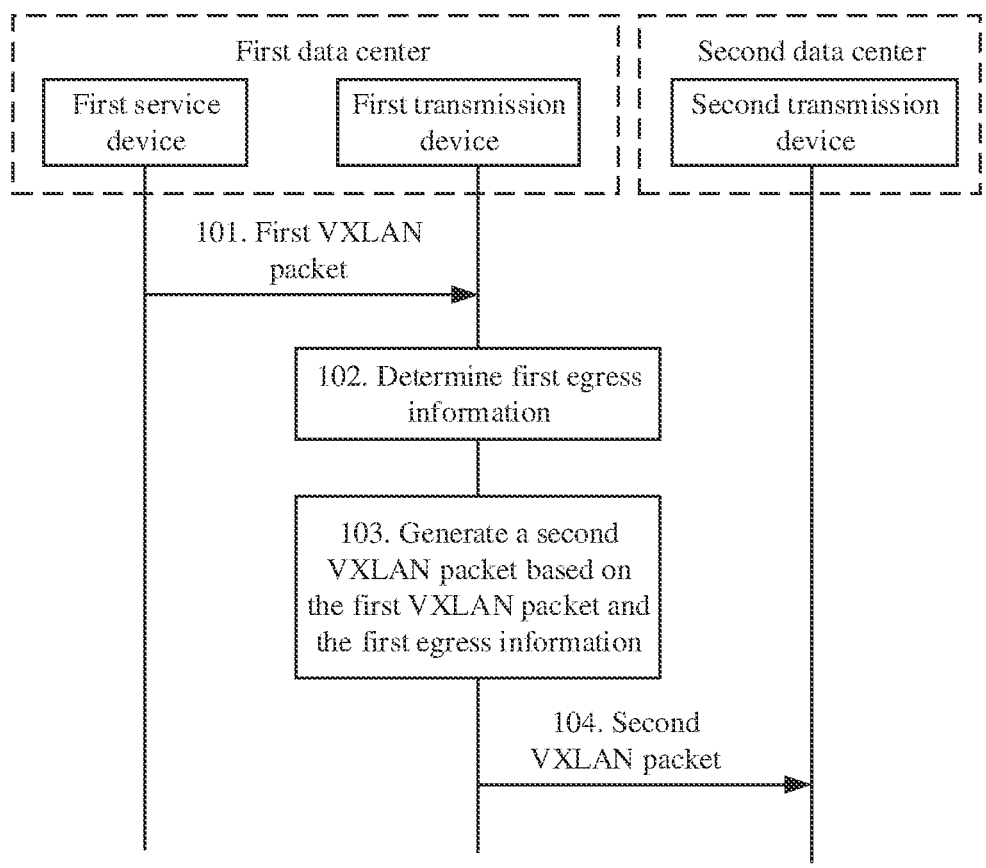
FIG. 3 is a schematic flowchart of a packet transmission method according to an embodiment of this application.

FIG. 3 is a schematic flowchart of a packet transmission method according to an embodiment of this application. The method shown in FIG. 3 may be performed by a first transmission device. The method shown in FIG. 3 specifically includes step 101 to step 104. The following separately describes step 101 to step 104 in detail.

101: The first transmission device receives a first VXLAN packet sent by a first service device.

Optionally, the receiving, by the first transmission device, a first VXLAN packet sent by a first service device includes: receiving, by the first transmission device, the first VXLAN packet sent by the first service device through a first virtual extensible local area network VXLAN tunnel.

In other words, the first VXLAN packet may be a VXLAN packet sent by the first service device to the first transmission device through the first VXLAN tunnel.

The first VXLAN tunnel is disposed between the first transmission device and the first service device. The first VXLAN packet includes a first VNI, and the first VNI indicates that a BD to which the first VXLAN packet sent by the first service device through the first VXLAN tunnel belongs is a first BD. The first transmission device and the first service device are located in a first DC.

The first transmission device may be a transmission device located at an edge of the first DC. In addition to receiving the first VXLAN packet sent by the first service device through the first VXLAN tunnel, the first transmission device may further receive another VXLAN packet sent by the first service device through the first VXLAN tunnel. A VNI of the another VXLAN packet may be different from the first VNI.

102: The first transmission device determines first egress information.

Optionally, the determining, by the first transmission device, first egress information includes: determining, by the first transmission device, the first egress information corresponding to a first BD and a first destination MAC address, based on a correspondence between the first BD, the first destination MAC address, and the first egress information.

Alternatively, the determining, by the first transmission device, first egress information includes: determining, by the first transmission device, the first egress information corresponding to the first BD and the first destination MAC address, based on a correspondence between a BD, a destination MAC address and egress information of the first VXLAN packet.

The first destination MAC address indicates a destination address of an Ethernet frame included in the first VXLAN packet, and the first egress information includes a first VTEP address and a second VNI. The second VNI indicates a VNI identifier of a second VXLAN packet generated based on the first VXLAN packet. The first VTEP address is a VTEP address of a device receiving the second VXLAN packet, namely, a VXLAN tunnel end point address of the device receiving the second VXLAN packet.

After obtaining the first egress information, the first transmission device may reencapsulate the first VXLAN packet based on the first egress information, and replace a VNI identifier of the first VXLAN packet with the second VNI, to generate a new second VXLAN packet.

It should be understood that there is a correspondence between a BD and a destination MAC address of a VXLAN packet and egress information of the VXLAN packet. In other words, the egress information of the VXLAN packet corresponds to one BD and one destination MAC address. Therefore, the egress information of the VXLAN packet may be determined based on the BD and the destination MAC address that are carried in the VXLAN packet.

Table 1 shows the correspondence between the BD and the destination MAC address of the VXLAN packet and the egress information of the VXLAN packet.

TABLE 1

| BD and destination MAC address of a VXLAN packet | Egress information of the VXLAN packet |
|---|---|
| First BD, first destination MAC address | First egress information |
| Second BD, second destination MAC address | Second egress information |
| ... | ... |

In Table 1, different BDs and destination MAC addresses correspond to one piece of egress information. Therefore, when a VXLAN packet is received, a BD and a destination MAC address may be extracted from the VXLAN packet, and then egress information of the VXLAN packet is determined based on the correspondence shown in Table 1.

After receiving the first VXLAN packet from the first service device, the first transmission device extracts the BD and the destination MAC address of the first VXLAN packet from the first VXLAN packet, and then obtains, based on the correspondence shown in Table 1, that the egress information of the first VXLAN packet is the first egress information.

103: The first transmission device generates a second VXLAN packet based on the first VXLAN packet and the first egress information.

The second VXLAN packet includes a second VNI and an Ethernet frame.

After receiving the first VXLAN packet, the first transmission device reencapsulates the first VXLAN packet based on the second VNI extracted from the first egress information, to obtain the second VXLAN packet. The second VXLAN packet includes the same Ethernet frame as the first VXLAN packet, but a VNI identifier included in the second VXLAN packet is different from a VNI identifier included in the first VXLAN packet.

104: The first transmission device sends the second VXLAN packet to a second transmission device through a second VXLAN tunnel.

The second transmission device is located in a second DC. The second DC is different from the first DC. The first VTEP address indicates a port through which the second transmission device connects to the second VXLAN tunnel. The second VNI indicates that a BD to which the second VXLAN packet sent by the first transmission device through the second VXLAN tunnel is a second BD.

It should be understood that the first VXLAN tunnel is a VXLAN tunnel disposed in a DC, and the second VXLAN tunnel is a VXLAN tunnel disposed between DCs. In this application, a transmission device may also be referred to as a transmission node, and a service device may also be referred to as a service node.

In this application, a VXLAN tunnel is established between network devices at edges of different data centers, so that each data center can independently plan the VXLAN tunnel, to form segment VXLAN tunnels of the different data centers. This facilitates more flexible packet transmission.

By disposing the segment VXLAN tunnels, VNI resource allocation of the different data centers is decoupled, so that each data center can independently plan and allocate a VNI to a tenant, without considering a VNI used by the tenant in another data center. This facilitates management.

Figure 4:
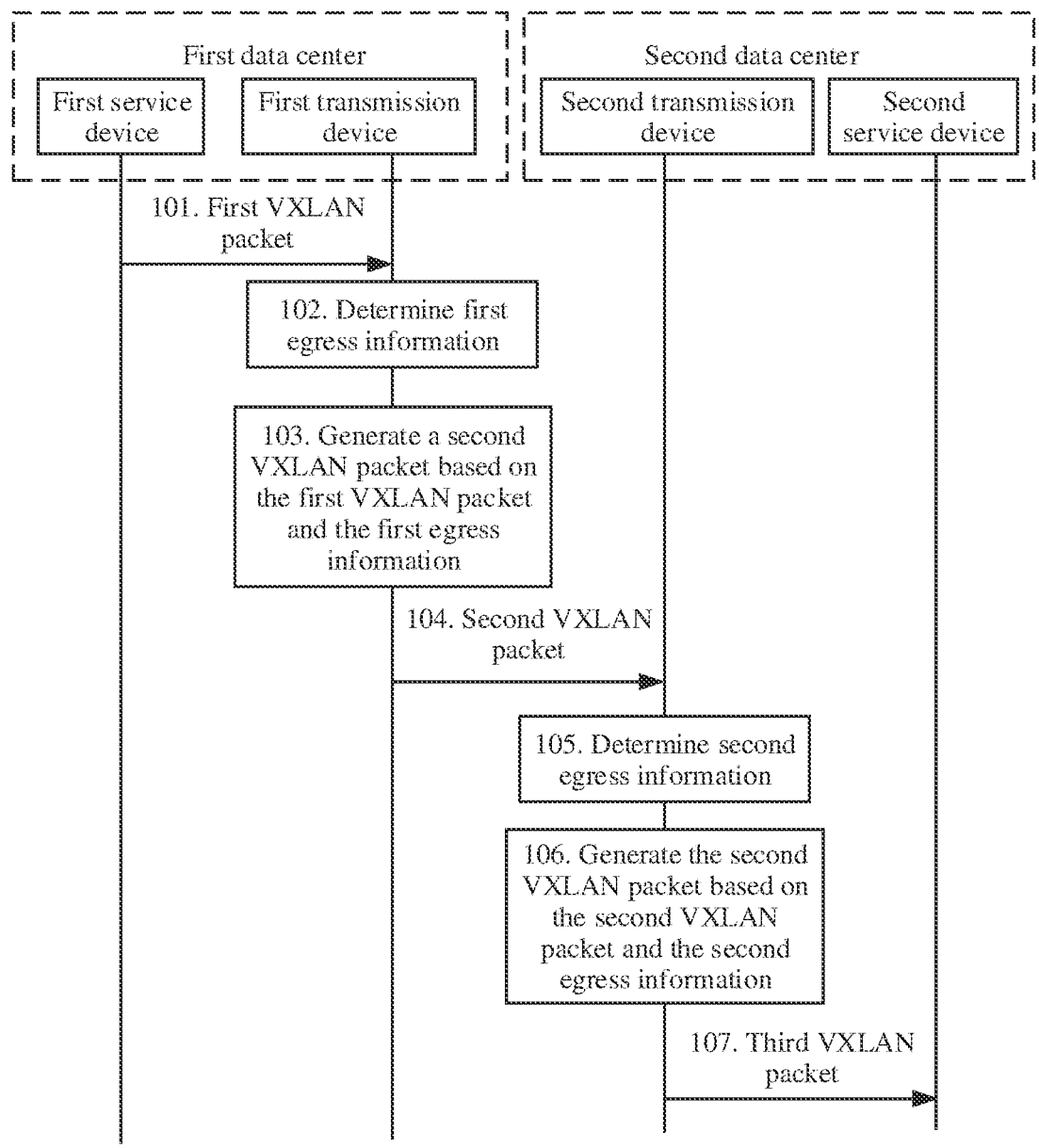
FIG. 4 is a schematic flowchart of a packet transmission method according to an embodiment of this application.

After the first transmission device sends the second VXLAN packet to the second transmission device through the second VXLAN tunnel, the second transmission device may generate a third VXLAN packet in a manner similar to a manner in which the first transmission device generates the second VXLAN packet, and send the third VXLAN packet to a second service device through a third VXLAN tunnel. With reference to FIG. 4, the following describes in detail a process in which the second transmission device generates the third VXLAN packet and sends the third VXLAN packet by using the second service device.

As shown in FIG. 4, the packet transmission method in this embodiment of this application may further include step 105 to step 107. Step 105 and step 107 may be performed by the second transmission device, and the second transmission device may be a transmission device located at an edge of the second data center. The following separately describes step 105 to step 107 in detail.

105: The second transmission device determines second egress information.

Optionally, the determining, by the second transmission device, second egress information includes: determining, by the second transmission device, the second egress information corresponding to the second BD and the first destination MAC address, based on a correspondence between a BD, a destination MAC address, and egress information of the second VXLAN packet.

The second egress information includes a second VTEP address and a third VNI. The third VNI indicates a VNI identifier of the third VXLAN packet generated based on the second VXLAN packet. The second VTEP address is an address of a port through which of a device receiving the third VXLAN packet connects to a VXLAN tunnel.

The second transmission device may extract the second VNI from the second VXLAN packet, and the second VNI indicates that the BD to which the second VXLAN packet sent by the first transmission device through the second VXLAN tunnel belongs is the second BD. Because the Ethernet frame carried in the second VXLAN packet is the same as the Ethernet frame carried in the first VXLAN packet, a destination MAC address of the Ethernet frame carried in the second VXLAN packet is the first destination MAC address. Therefore, the second transmission device may obtain the second BD and the first destination MAC address based on the second VXLAN packet. Then, the second transmission device may determine, based on the correspondence shown in Table 1, that egress information corresponding to the second BD and the first destination MAC address is the second egress information.

106: The second transmission device generates the third VXLAN packet based on the second VXLAN packet and the second egress information.

The third VXLAN packet includes the third VNI and an Ethernet frame.

After receiving the second VXLAN packet, the second transmission device reencapsulates the second VXLAN packet based on the third VNI obtained from the second egress information, to obtain the third VXLAN packet. The third VXLAN packet includes the same Ethernet frame as the second VXLAN packet, but the VNI identifier included in the third VXLAN packet is different from the VNI identifier included in the second VXLAN packet.

It should be understood that, when the second transmission device reencapsulates the second VXLAN packet, if the second VNI is the same as the third VNI, the second transmission device does not need to update the VNI identifier of the second VXLAN packet; and if the second VNI identifier is different from the third VNI identifier, the second transmission device needs to update the VNI identifier of the second VXLAN packet to obtain the third VXLAN packet, where the VNI identifier of the third VXLAN packet is the third VNI.

107: The second transmission device sends the third VXLAN packet to the second service device.

Optionally, the second transmission device sends the third VXLAN packet to the second service device through the third VXLAN tunnel.

The third VXLAN tunnel is disposed between the second transmission device and the second service device, and the third VXLAN tunnel is a VXLAN tunnel between devices located in the second DC.

In this application, both the first VXLAN tunnel and the third VXLAN tunnel are VXLAN tunnels located in a DC, and the second VXLAN tunnel is a VXLAN tunnel located between DCs.

Optionally, in an embodiment, the second VNI is the same as the third VNI.

The second VNI is the VNI identifier included in the second VXLAN packet. The third VNI is the VNI identifier included in the third VXLAN packet. That the second VNI is the same as the third VNI indicates that the VNI identifier carried in the second VXLAN packet is the same as the VNI identifier carried in the third VXLAN packet.

When the VNI identifier of the third VXLAN packet is the same as the VNI identifier of the second VXLAN packet, complexity of transmitting a VXLAN packet between different VXLAN tunnels can be simplified. When the VNI identifier of the third VXLAN packet is the same as the VNI identifier of the second VXLAN packet, when generating the third VXLAN packet based on the second VXLAN packet, the second transmission device does not need to replace the VNI identifier of the second VXLAN packet. This simplifies complexity of generating the third VXLAN packet based on the second VXLAN packet.

Figure 5:
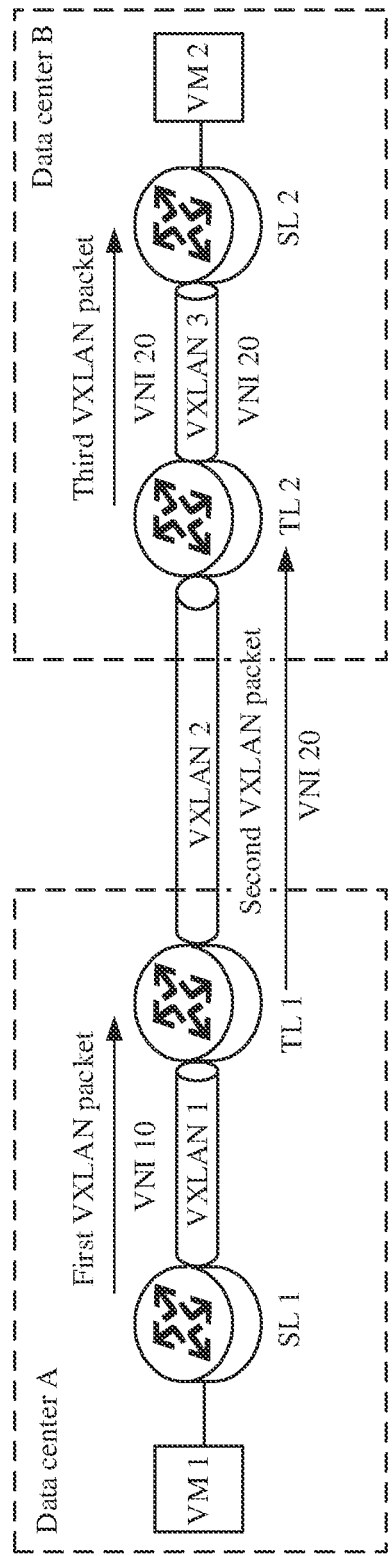
FIG. 5 is a schematic diagram of a packet transmission method according to an embodiment of this application.

For example, as shown in FIG. 5, a segmented VXLAN tunnel is set between devices in a data center A and a data center B, where a VXLAN 1 is set between an SL 1 and a TL 1, a VXLAN 2 is set between a TL 1 and a TL 2, and a VXLAN 3 is set between a TL 2 and an SL 2. When sending a VXLAN packet, the SL 1 may send a first VXLAN packet to the TL 1 through the VXLAN 1 tunnel; the TL 1 sends a second VXLAN packet to the TL 2 through the VXLAN 2 tunnel; and the TL 2 sends a third VXLAN packet to the SL 2 through the VXLAN 3 tunnel. The first VXLAN packet includes a VNI 10. Both the second VXLAN packet and the third VXLAN packet include a VNI 20, and the second VXLAN packet and the third VXLAN packet have a same VNI identifier. Table 2 shows VNI identifiers included in the first VXLAN packet, the second VXLAN packet, and the third VXLAN packet.

TABLE 2

| VXLAN packet | VNI Identifier |
| --- | --- |
| First VXLAN packet | VNI 10 |
| Second VXLAN packet | VNI 20 |
| Third VXLAN packet | VNI 20 |

As shown in FIG. 5, when generating the second VXLAN packet based on the first VXLAN packet, the TL 1 needs to replace a VNI identifier of the first VXLAN packet, so that a VNI identifier of the generated second VXLAN packet is consistent with a VNI identifier of the third VXLAN packet subsequently generated by the TL 2. This manner of determining a VNI identifier may be referred to as a downstream label distribution manner (downstream vni).

Optionally, in an embodiment, a second VNI is different from a third VNI.

That the second VNI is different from the third VNI indicates that the VNI identifier carried in the second VXLAN packet is different from the VNI identifier carried in the third VXLAN packet.

When the VNI identifier of the third VXLAN packet is different from the VNI identifier of the second VXLAN packet, a VNI identifier of a VXLAN packet transmitted through the second VXLAN tunnel is independent of a VNI identifier of a VXLAN packet transmitted through the third VXLAN tunnel, traffic of VXLAN packets separately transmitted on the second VXLAN tunnel and the third VXLAN tunnel can be easily monitored.

Figure 6:
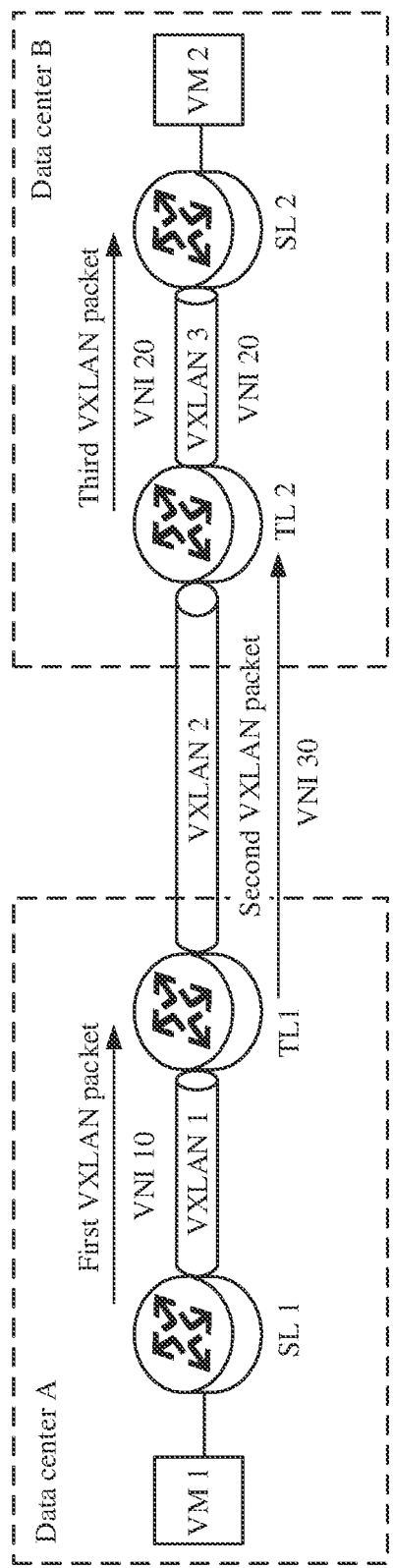
FIG. 6 is a schematic diagram of a packet transmission method according to an embodiment of this application.

For example, as shown in FIG. 6, a segmented VXLAN tunnel is set between devices in a data center A and a data center B, where a VXLAN 1 is set between an SL 1 and a TL 1, a VXLAN 2 is set between a TL 1 and a TL 2, and a VXLAN 3 is set between a TL 2 and an SL 2. When sending a VXLAN packet, the SL 1 may send a first VXLAN packet to the TL 1 through the VXLAN 1 tunnel; the TL 1 sends a second VXLAN packet to the TL 2 through the VXLAN 2 tunnel; and the TL 2 sends a third VXLAN packet to the SL 2 through the VXLAN 3 tunnel. The first VXLAN packet includes a VNI 10; the second VXLAN packet includes a VNI 30; and the third VXLAN packet includes a VNI 20. Table 3 shows VNI identifiers included in the first VXLAN packet, the second VXLAN packet, and the third VXLAN packet.

TABLE 3

| VXLAN packet | VNI Identifier |
| --- | --- |
| First VXLAN packet | VNI 10 |
| Second VXLAN packet | VNI 30 |
| Third VXLAN packet | VNI 20 |

As shown in FIG. 6, when generating the second VXLAN packet based on the first VXLAN packet, the TL 1 needs to replace the first VXLAN packet with an intermediate (bridge) VNI identifier (the VNI 30 used herein) to obtain the second VXLAN packet. The intermediate VNI identifier is different from a VNI identifier of the first VXLAN packet and a VNI identifier of the third VXLAN packet subsequently generated by the TL 2. When generating the third VXLAN packet based on the second VXLAN packet, the TL 2 replaces the intermediate VNI identifier carried in the second VXLAN packet to obtain the third VXLAN packet. This manner of determining a VNI identifier may be referred to as a VNI mapping manner (mapping vni).

It should be understood that, before generating corresponding egress information based on a correspondence between a BD, a destination MAC address, and egress information, a first transmission device may first receive a MAC/IP advertisement route sent by a second transmission device, and then extract the correspondence between the BD, the destination MAC address, and the egress information from the MAC/IP advertisement route.

Optionally, in an embodiment, the method shown in FIG. 3 further includes: receiving, by the first transmission device, a first MAC/IP advertisement route sent by the second transmission device, where the first MAC/IP advertisement route includes the first destination MAC address and the second VNI; and generating, by the first transmission device, the correspondence between the first BD, the first destination MAC address, and the first egress information based on the first MAC/IP advertisement route.

The first MAC/IP advertisement route indicates that a VNI identifier of the second VXLAN packet sent by the first transmission device to the second transmission device is the second VNI, and a destination MAC address of the second VXLAN packet sent by the first transmission device to the second transmission device is the first destination MAC address.

It should be understood that the first transmission device may receive, before receiving the first VXLAN packet, the first MAC/IP advertisement route sent by the second transmission device. In this way, after receiving the first MAC/IP advertisement route, if the first VXLAN packet is received again, the first transmission device may reencapsulate the first VXLAN packet based on information carried in the first MAC/IP advertisement route, to obtain the second VXLAN packet.

By receiving a MAC/IP advertisement route sent by an adjacent device, a correspondence between a BD, a destination MAC address, and egress information may be extracted from the MAC/IP advertisement route, so that the egress information may be determined subsequently based on the extracted correspondence between the BD, the destination MAC address, and the egress information. This facilitates encapsulation of a VXLAN packet.

Optionally, in an embodiment, the method shown in FIG. 3 further includes: sending, by the first transmission device, a second MAC/IP advertisement route to the first service device, where the second MAC/IP advertisement route includes the first destination MAC address and the first VNI.

The second MAC/IP advertisement route indicates that a VNI identifier of the first VXLAN packet sent by the first service device to the first transmission device is the first VNI, and a destination MAC address of the first VXLAN packet sent by the first service device to the first transmission device is the first destination MAC address.

By sending the MAC/IP advertisement route to the adjacent device, the adjacent device extracts the correspondence between the BD, the destination MAC address, and the egress information from the MAC/IP advertisement route, so that the adjacent device subsequently determines the egress information based on the extracted correspondence between the BD, the destination MAC address, and the egress information. This facilitates encapsulation of a VXLAN packet.

It should be understood that the first transmission device may send the second MAC/IP advertisement route to the first service device before receiving the first VXLAN packet sent by the first service device. After obtaining the second MAC/IP advertisement route, if the first service device receives the first data packet from the first virtual device in the first DC, the first service device may encapsulate the first data packet based on information obtained through the second MAC/IP advertisement route, to generate the first VXLAN packet.

For explanations of the first MAC/IP advertisement route and the second MAC/IP advertisement route, refer to a description of MAC/IP advertisement route (MAC/IP Advertisement Route) in section 7.2 of request for comments (RFC) 7432 in the internet engineering task force (IETF).

Optionally, in an embodiment, the method shown in FIG. 3 further includes: receiving, by the first transmission device, a first route that is sent by the first service device and that is reflected by a first RR and that is used to establish the first VXLAN tunnel, where the first RR is located in the first DC; adding, by the first transmission device, the first VXLAN tunnel to a first split horizon group, where the first split horizon group is a split horizon group in the first DC; receiving, by the first transmission device, a second route that is sent by the second transmission device and that is reflected by a second RR and that is used to establish the second VXLAN tunnel, where the second RR is located outside the first DC; and adding, by the first transmission device, the second VXLAN tunnel to a second split horizon group, where the second split horizon group is a split horizon group outside the first DC.

It should be understood that when sending a VXLAN packet, a transmission device sends the VXLAN packet only to a device in another split horizon group other than the split horizon group in which the transmission device is located, and does not send the packet to a device in the split horizon group, thereby ensuring normal transmission of the packet.

It should be further understood that the split horizon group may be implemented in a static configuration manner in advance. For example, different devices may be manually divided, and corresponding group identifiers are written into the devices.

The first RR may be an independent device in the first DC, or may be disposed on a device in the first DC. Similarly, the second RR may be an independent device outside the first DC, or may be disposed on a transmission device outside the first DC.

In addition, the first route and the second route may be inclusive multicast Ethernet tag (IMET) routes. For an explanation of an inclusive multicast Ethernet tag route, refer to a description of the inclusive multicast Ethernet tag route in section 7.3 of RFC7432.

Optionally, in an embodiment, the method shown in FIG. 3 further includes: determining, by the first transmission device based on the first VTEP address, that the second transmission device is located in the second DC.

The first transmission device may determine, based on a VTEP address extracted from the egress information, a DC in which a device at a VXLAN packet receive end is located, and send a VXLAN packet to the device when the VXLAN packet receive end device is located outside the DC in which the transmission device is located. This ensures that an Ethernet frame carried in the VXLAN packet is finally transmitted to a target device.

When the first transmission device generates the second VXLAN packet based on the first VXLAN packet, the VNI identifier of the VXLAN packet may be consistent with the VNI identifier of the third VXLAN packet, or may be different from the VNI identifiers of the first VXLAN packet and the third VXLAN packet, but is an intermediate VNI.

Figure 7:
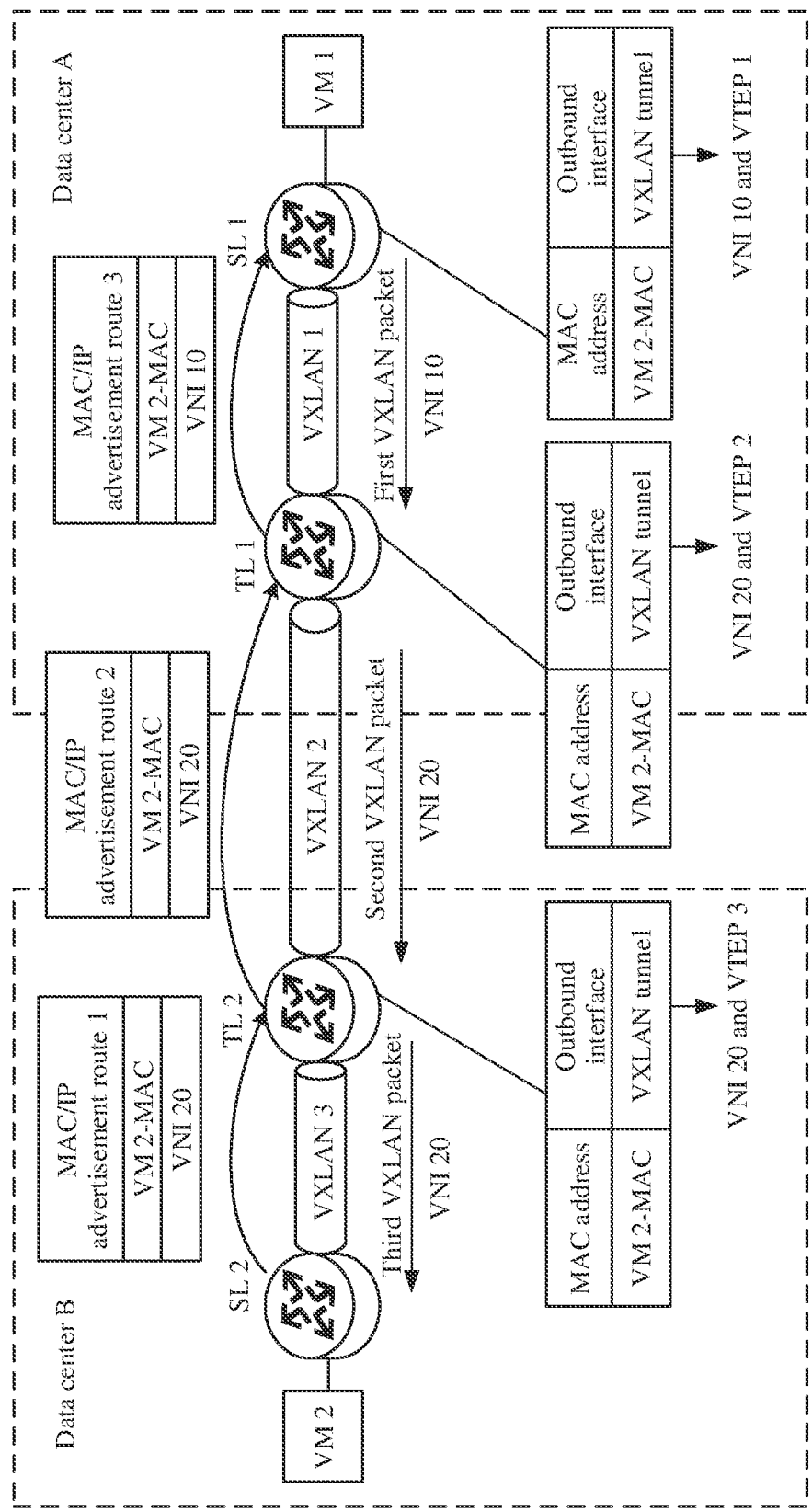
FIG. 7 is a schematic diagram of a packet transmission method according to an embodiment of this application.
Figure 8:
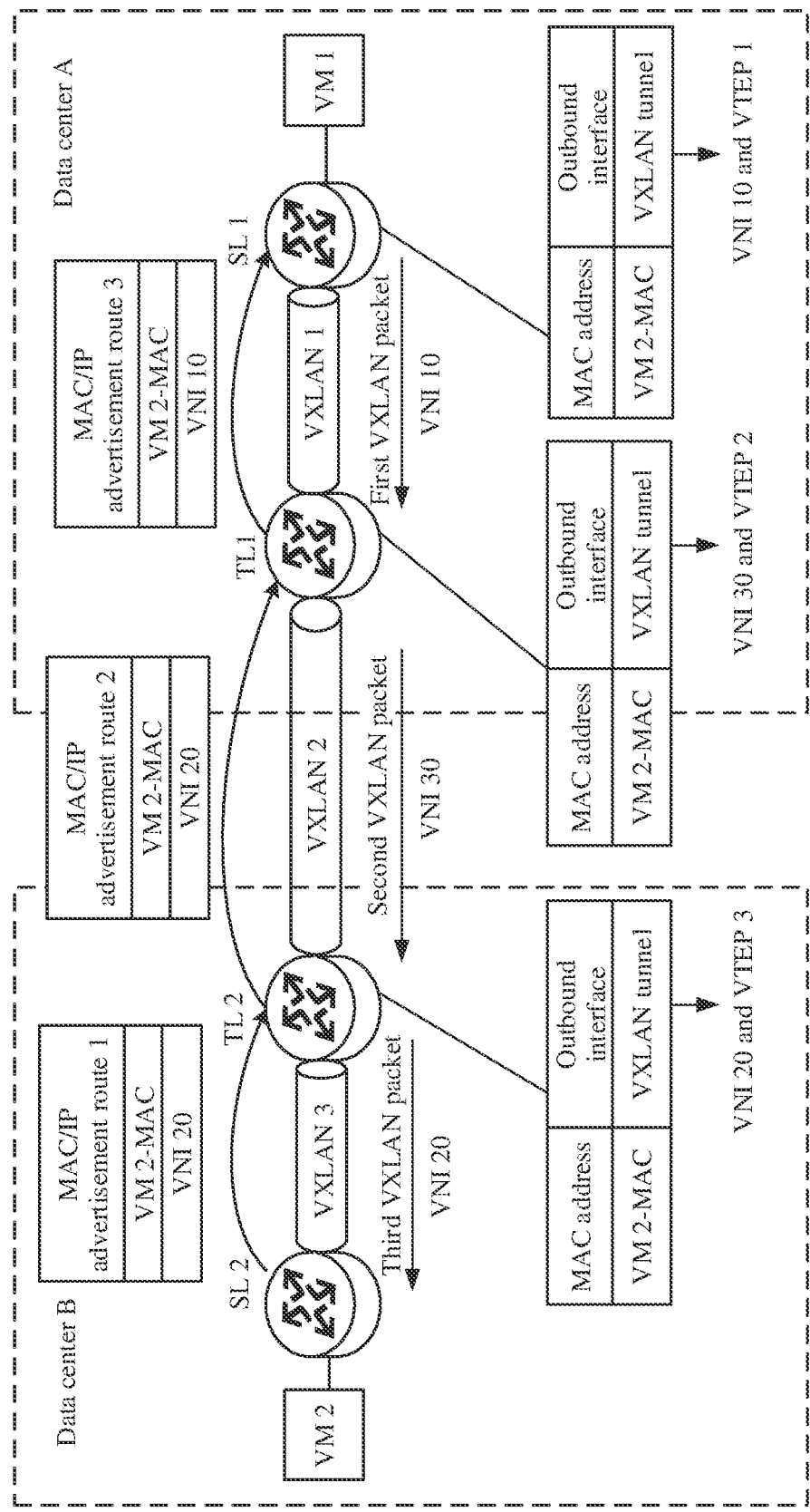
FIG. 8 is a schematic diagram of a packet transmission method according to an embodiment of this application.

The following describes in detail how to transmit a VXLAN packet in the two cases with reference to FIG. 7 and FIG. 8.

As shown in FIG. 7, an SL 1, a TL 1, and a VM 1 are located in a data center A. The SL 1 is a service device; the TL 1 is a transmission device at an edge of the data center A; and the VM 1 is a virtual machine. An SL 2, a TL 2, and a VM 2 are located in a data center B. The SL 2 is a service device; the TL 2 is a transmission device located at an edge of the data center B; and the VM 2 is a virtual machine. A VXLAN 1 tunnel is established between the SL 1 and the TL 1; a VXLAN 2 tunnel is established between the TL 1 and the TL 2, and a VXLAN 3 tunnel is established between the SL 2 and the TL 2.

It should be understood that, the data center A in FIG. 7 is equivalent to the first data center; the SL 1 is equivalent to the first service device; the TL 1 is equivalent to the first transmission device; the data center B is equivalent to the second data center; the SL 2 is equivalent to the second service device; the TL 2 is equivalent to the second transmission device. The VXLAN 1 is equivalent to the first VXLAN tunnel; the VXLAN 2 is equivalent to the second VXLAN tunnel, and the VXLAN 3 is equivalent to the third VXLAN tunnel.

After the VXLAN 1, the VXLAN 2, and the VXLAN 3 are established, MAC/IP advertisement routes may be sent between the devices in the data center A and the data center B to transmit a VXLAN packet through these VXLAN tunnels. In other words, before the VXLAN packet is formally transmitted through the VXLAN tunnels, adjacent devices may transmit a MAC/IP advertisement route to each other, so that an adjacent device extracts a correspondence between a BD, a destination MAC address, and egress information from the MAC/IP advertisement route, and then determine the egress information based on the extracted correspondence between the BD, the destination MAC address, and the egress information, to generate the VXLAN packet based on the egress information.

As shown in FIG. 7, the SL 2 may send a MAC/IP advertisement route 1 to the TL 2; the TL 2 may send a MAC/IP advertisement route 2 to the TL 1; and the TL 1 may send a MAC/IP advertisement route 3 to the SL 1.

The MAC/IP advertisement route 1 includes a MAC address (equivalent to the first destination MAC address) of the VM 2 and a VNI 20 (equivalent to the third VNI), and is used to indicate that a VNI identifier of a VXLAN packet sent by the TL 2 to the SL 2 is the VNI 20, and a destination MAC address is the MAC address of the VM 2.

The MAC/IP advertisement route 2 is equivalent to the first MAC/IP advertisement route. The MAC/IP advertisement route 2 includes the MAC address (equivalent to the first destination MAC address) of the VM 2 and the VNI 20 (equivalent to the second VNI, and in a case shown in FIG. 7, the second VNI is the same as the third VNI), and is used to indicate that a VNI identifier of a VXLAN packet sent by the TL 1 to the TL 2 is the VNI 20, and the destination MAC address is the MAC address of the VM 2.

The MAC/IP advertisement route 3 is equivalent to the second MAC/IP advertisement route. The MAC/IP advertisement route 3 includes the MAC address (equivalent to the first destination MAC address) of the VM 2 and a VNI 10 (equivalent to the first VNI), and is used to indicate that a VNI identifier of a VXLAN packet sent by the SL 1 to the TL 1 is the VNI 10, and the destination MAC address is the MAC address of the VM 2.

After the TL 2, the TL 1, and the SL 1 respectively receive the three advertisement routes, the TL 2, the TL 1, and the SL 1 may determine the destination MAC address and outbound interface information based on the received advertisement routes. The destination MAC address and the outbound interface information determined by these devices are shown in FIG. 7.

The TL 2 may determine, based on the MAC/IP advertisement route 1, that the destination MAC address is the MAC address of the VM 2, and the outbound interface information includes the VNI 20 and a VTEP 3. The VTEP 3 indicates a port through which the SL 2 connects to the VXLAN 3 tunnel.

The TL 1 may determine, based on the MAC/IP advertisement route 2, that the destination MAC address is the MAC address of the VM 2, and the outbound interface information includes the VNI 20 and a VTEP 2. The VTEP 2 indicates a port through which the TL 2 connects to the VXLAN 2 tunnel.

The SL 1 may determine, based on the MAC/IP advertisement route 3, that the destination MAC address is the MAC address of the VM 2, and the outbound interface information includes the VNI 10 and a VTEP 1. The VTEP 1 indicates a port through which the TL 1 connects to the VXLAN 1 tunnel.

After obtaining the destination MAC address and the outbound interface information, the VXLAN packet may be transmitted over the VXLAN tunnels.

A specific process of the VM 1 in the data center A transmitting a VXLAN packet through the three VXLAN tunnels (the VXLAN 1, the VXLAN 2, and the VXLAN 3) is as follows:

301: The SL 1 receives a first data packet sent by the VM 1.

The first data packet includes an Ethernet frame. A destination MAC address of the Ethernet frame is the MAC address of the VM 2.

302: The SL 1 obtains the destination MAC address and the outbound interface information based on the MAC/IP advertisement route 3 received from the TL 1.

The destination MAC address obtained by the SL 1 is the MAC address of the VM 2. The outbound interface information includes the VNI 10 and the VTEP 1, and the VTEP 1 indicates the port through which the TL 1 connects to the VXLAN 1 tunnel. Then, the SL 1 may encapsulate the first data packet based on the VNI 10, and send a first VXLAN packet obtained through reencapsulation to the TL 1.

303: The SL 1 encapsulates the first data packet to obtain the first VXLAN packet.

The first VXLAN packet includes the Ethernet frame in the first data packet. The destination MAC address of the Ethernet frame is the MAC address of the VM 2. A VNI identifier of the first VXLAN packet is the VNI 10.

304: The SL 1 sends the first VXLAN packet to the TL 1.

305: The TL 1 reencapsulates the first VXLAN packet based on the obtained MAC/IP advertisement route 2, to obtain a second VXLAN packet.

The TL 1 may determine, based on the MAC/IP advertisement route 2, that the destination MAC address is the MAC address of the VM 2, and the outbound interface information includes the VNI 20 and the VTEP 2. The VTEP 2 indicates the port through which the TL 2 connects to the VXLAN 2 tunnel. Then, the TL 1 replaces the VNI identifier of the first VXLAN packet to obtain the second VXLAN packet. A VNI identifier of the second VXLAN packet is the VNI 20.

306: The TL 1 sends the second VXLAN packet to the TL 2.

307: The TL 2 reencapsulates the second VXLAN packet based on the obtained MAC/IP advertisement route 3, to obtain a third VXLAN packet.

The TL 2 may determine, based on the MAC/IP advertisement route 1, that the destination MAC address is the MAC address of the VM 2, and the outbound interface information includes the VNI 20 and the VTEP 3. The VTEP 3 indicates the port through which the SL 2 connects to the VXLAN 3 tunnel. Then, the TL 2 encapsulates the second VXLAN packet to obtain the third VXLAN packet. Because a VNI identifier obtained by the TL 2 is the VNI 20, which is the same as the VNI identifier of the second VXLAN packet, the TL 2 does not replace the VNI identifier when reencapsulating the second VXLAN packet.

It should be understood that, in step 305, the VNI identifier of the second VXLAN packet generated by the TL 1 needs to be consistent with a VNI identifier of the third VXLAN packet (both are the VNI 20). This manner is the downstream label distribution manner mentioned above.

308: The TL 2 sends the third VXLAN packet to the SL 2.

309: The SL 2 parses the third VXLAN packet to obtain the first data packet.

310: The SL 2 sends the first data packet to the VM 2.

After receiving the third VXLAN packet, the SL 2 removes an outer IP header and an outer UDP header of the third VXLAN packet, checks the VNI 20 of the packet and a destination MAC address of an internal data frame, removes a VXLAN header after determining that the receiver VM 2 is connected to a local VTEP node, and sends an obtained first data frame to the VM 2.

As shown in FIG. 8, an SL 1, a TL 1, and a VM 1 are located in a data center A. The SL 1 is a service device; the TL 1 is a transmission device at an edge of the data center A; and the VM 1 is a virtual machine. An SL 2, a TL 2, and a VM 2 are located in a data center B. The SL 2 is a service device; the TL 2 is a transmission device located at an edge of the data center B; and the VM 2 is a virtual machine. A VXLAN 1 tunnel is established between the SL 1 and the TL 1; a VXLAN 2 tunnel is established between the TL 1 and the TL 2, and a VXLAN 3 tunnel is established between the SL 2 and the TL 2.

The data center A in FIG. 8 is equivalent to the first data center; the SL 1 is equivalent to the first service device; the TL 1 is equivalent to the first transmission device; the data center B is equivalent to the second data center; the SL 2 is equivalent to the second service device; the TL 2 is equivalent to the second transmission device.

After the VXLAN 1, the VXLAN 2, and the VXLAN 3 are established, MAC/IP advertisement routes may be sent between the devices in the data center A and the data center B to transmit a VXLAN packet through these VXLAN tunnels. In other words, before the VXLAN packet is formally transmitted through the VXLAN tunnels, adjacent devices may transmit a MAC/IP advertisement route to each other, so that an adjacent device extracts a correspondence between a BD, a destination MAC address, and egress information from the MAC/IP advertisement route, and then determine the egress information based on the extracted correspondence between the BD, the destination MAC address, and the egress information, to generate the VXLAN packet based on the egress information.

As shown in FIG. 8, the SL 2 may send a MAC/IP advertisement route 1 to the TL 2; the TL 2 may send a MAC/IP advertisement route 2 to the TL 1; and the TL 1 may send a MAC/IP advertisement route 3 to the SL 1.

The MAC/IP advertisement route 1 includes a MAC address (equivalent to the first destination MAC address) of the VM 2 and a VNI 20 (equivalent to the third VNI), and is used to indicate that a VNI identifier of a VXLAN packet sent by the TL 2 to the SL 2 is the VNI 20, and a destination MAC address is the MAC address of the VM 2.

The MAC/IP advertisement route 2 includes the MAC address (equivalent to the first destination MAC address) of the VM 2 and a VNI 30 (equivalent to the second VNI, and in a case shown in FIG. 8, the second VNI is different from the third VNI), and is used to indicate that a VNI identifier of a VXLAN packet sent by the TL 1 to the TL 2 is the VNI 30, and the destination MAC address is the MAC address of the VM 2.

The MAC/IP advertisement route 3 includes the MAC address (equivalent to the first destination MAC address) of the VM 2 and a VNI 10 (equivalent to the first VNI), and is used to indicate that a VNI identifier of a VXLAN packet sent by the SL 1 to the TL 1 is the VNI 10, and the destination MAC address is the MAC address of the VM 2.

After the TL 2, the TL 1, and the SL 1 respectively receive the three advertisement routes, the TL 2, the TL 1, and the SL 1 may determine the destination MAC address and outbound interface information based on the received advertisement routes. The destination MAC address and the outbound interface information determined by these devices are shown in FIG. 8.

The TL 2 may determine, based on the MAC/IP advertisement route 1, that the destination MAC address is the MAC address of the VM 2, and the outbound interface information includes the VNI 20 and a VTEP 3. The VTEP 3 indicates a port through which the SL 2 connects to the VXLAN 3 tunnel.

The TL 1 may determine, based on the MAC/IP advertisement route 2, that the destination MAC address is the MAC address of the VM 2, and the outbound interface information includes the VNI 30 and a VTEP 2. The VTEP 2 indicates a port through which the TL 2 connects to the VXLAN 2 tunnel.

The SL 1 may determine, based on the MAC/IP advertisement route 3, that the destination MAC address is the MAC address of the VM 2, and the outbound interface information includes the VNI 10 and a VTEP 1. The VTEP 1 indicates a port through which the TL 1 connects to the VXLAN 1 tunnel.

After obtaining the destination MAC address and the outbound interface information, a VXLAN packet may be transmitted over the VXLAN tunnels.

A specific process of the VM 1 in the data center A transmitting a VXLAN packet through the three VXLAN tunnels (the VXLAN 1, the VXLAN 2, and the VXLAN 3) is as follows:

401: The SL 1 receives a first data packet sent by the VM 1.

402: The SL 1 obtains the destination MAC address and the outbound interface information based on the MAC/IP advertisement route 3 received from the TL 1.

403: The SL 1 encapsulates the first data packet to obtain the first VXLAN packet.

404: The SL 1 sends the first VXLAN packet to the TL 1.

Content of the steps 401 to 403 is the same as that of the steps 301 to 304, and details are not described herein again.

405: The TL 1 reencapsulates the first VXLAN packet based on the obtained MAC/IP advertisement route 2, to obtain a second VXLAN packet.

The TL 1 may determine, based on the MAC/IP advertisement route 2, that the destination MAC address is the MAC address of the VM 2, and the outbound interface information includes the VNI 30 and the VTEP 2. The VTEP 2 indicates the port through which the TL 2 connects to the VXLAN 2 tunnel. Then, the TL 1 replaces the VNI identifier of the first VXLAN packet to obtain the second VXLAN packet. A VNI identifier of the second VXLAN packet is the VNI 30.

406: The TL 1 sends the second VXLAN packet to the TL 2.

407: The TL 2 reencapsulates the second VXLAN packet based on the obtained MAC/IP advertisement route 3, to obtain a third VXLAN packet.

The TL 2 may determine, based on the MAC/IP advertisement route 1, that the destination MAC address is the MAC address of the VM 2, and the outbound interface information includes the VNI 20 and the VTEP 3. The VTEP 3 indicates the port through which the SL 2 connects to the VXLAN 3 tunnel. Then, the TL 2 encapsulates the second VXLAN packet to obtain the third VXLAN packet. Because a VNI identifier obtained by the TL 2 is the VNI 20, which is different from the VNI identifier of the second VXLAN packet, the TL 2 needs to replace the second VXLAN packet with the VNI 30 (an intermediate VNI) when reencapsulating the second VXLAN packet. The obtained third VXLAN packet includes the VNI 30.

It should be understood that, when the second VXLAN packet is generated based on the first VXLAN packet, the VNI identifier of the first VXLAN packet is replaced with an intermediate VNI to obtain the second VXLAN packet; and then when the third VXLAN packet is generated based on the second VXLAN packet, an intermediate VNI identifier in the second VXLAN packet is replaced. This manner is the VNI mapping manner mentioned above.

408: The TL 2 sends the third VXLAN packet to the SL 2.

409: The SL 2 parses the third VXLAN packet to obtain the first data packet.

410: The SL 2 sends the first data packet to the VM 2.

Content of the steps 408 to 410 is the same as that of the steps 308 to 310, and details are not described herein again.

It should be understood that a main difference between the packet transmission processes described with reference to FIG. 7 and FIG. 8 lies in a manner in which the TL 1 generates the second VXLAN packet after receiving the first VXLAN packet. In the process shown in FIG. 7, the TL 1 obtains the identifier of the second VXLAN packet in the downstream label distribution manner, and then generates the second VXLAN packet based on the first VXLAN packet. However, in the process shown in FIG. 8, the TL 1 obtains the identifier of the second VXLAN packet in the VNI mapping manner, and then generates the second VXLAN packet based on the first VXLAN packet.

In this application, there are two types of VXLAN tunnels: a VXLAN tunnel located in a data center and a VXLAN tunnel located between data centers.

The VXLAN tunnel in a data center and the VXLAN tunnel between data centers may be established by using a border gateway protocol (BGP) Ethernet virtual private network (EVPN). Alternatively, the VXLAN tunnel in a data center and the VXLAN tunnel between data centers may be established in a static manner.

Figure 9:
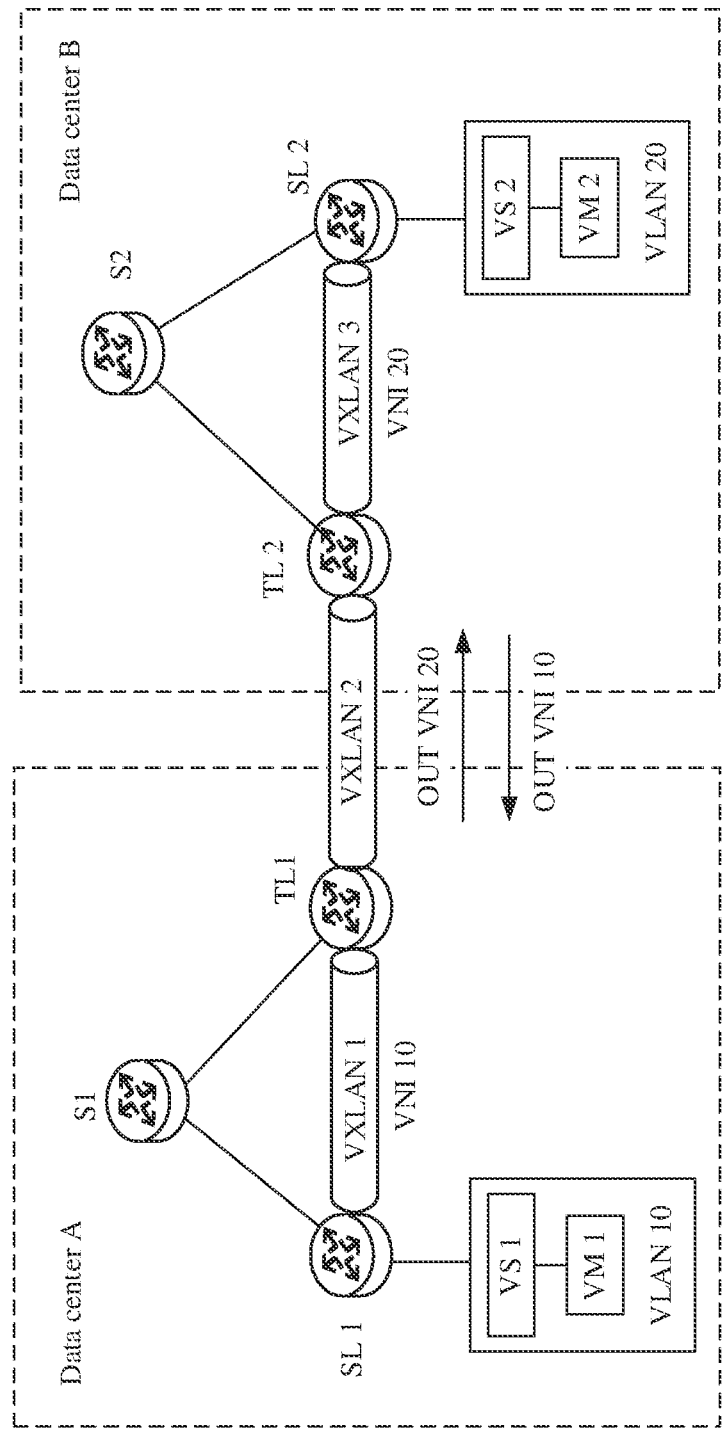
FIG. 9 is a schematic diagram of implementing layer 2 communication between a data center A and a data center B by using a VXLAN tunnel.
Figure 10:
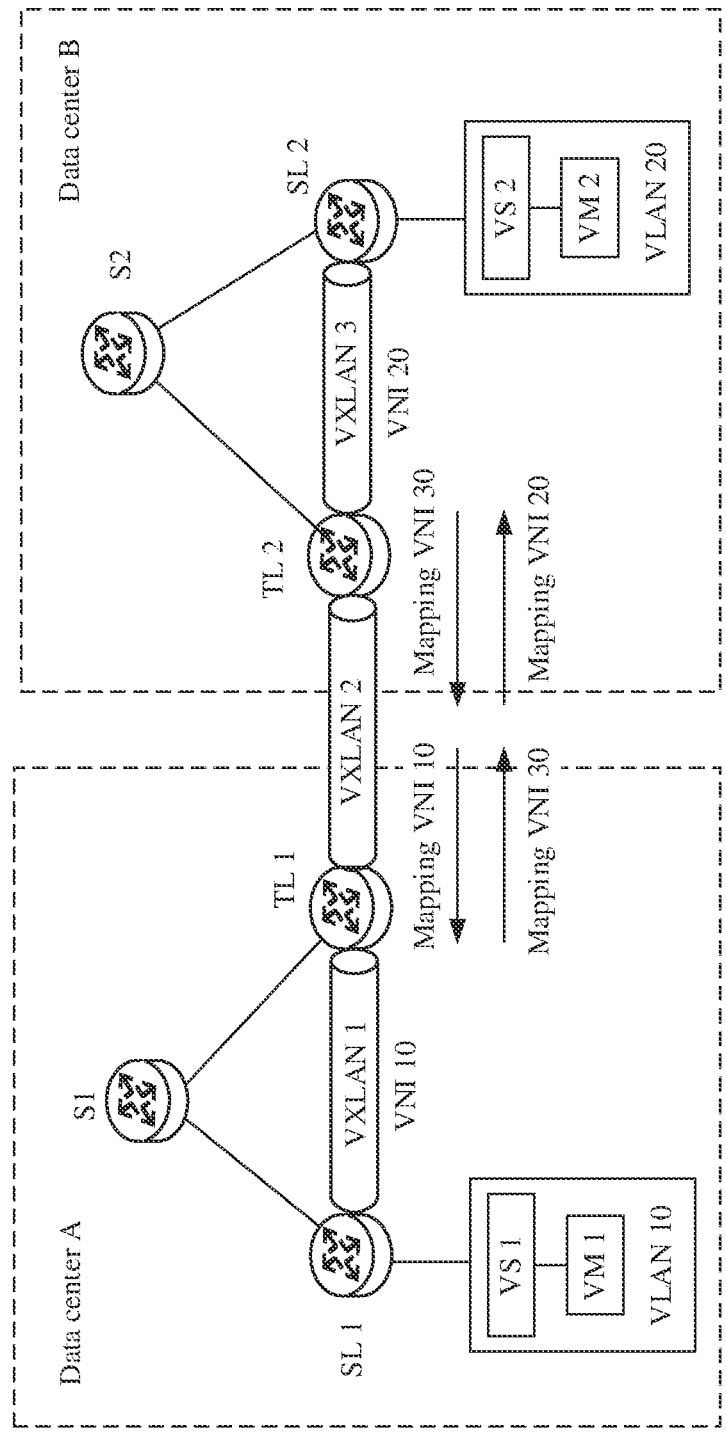
FIG. 10 is a schematic diagram of implementing layer 2 communication between a data center A and a data center B by using a VXLAN tunnel.

With reference to FIG. 9 and FIG. 10, the following describes in detail that VXLAN tunnels are separately created in a data center A and a data center B and layer 2 communication between the data center A and the data center B is implemented.

As shown in FIG. 9, the VXLAN tunnels are separately created in the data center A and the data center B, and a VXLAN tunnel is created between an edge device TL 1 in the data center A and an edge device TL 2 in the data center B. When virtual machines VM 1 and VM 2 need to communicate with each other, the layer 2 communication needs to be implemented between the data center A and the data center B. If the VXLAN tunnels in the data center A and the data center B use a same VNI, only the same VNI needs to be used to establish the VXLAN tunnel between the TL 1 and the TL 2. However, in actual application, different data centers have their own VNI spaces. To enable the data center A and the data center B to independently plan their own VXLAN tunnels, the VXLAN tunnels in the data center A and the data center B need to use different VNIs. In this case, when the VXLAN tunnel is configured between the TL 1 and the TL 2, VXLAN mapping needs to be configured for VNI conversion.

FIG. 9 shows VXLAN mapping in local VNI mode. A VNI used by a VXLAN tunnel in the data center A is 10, and a VNI used by a VXLAN tunnel in the data center B is 20. Therefore, on the TL 1, an outbound VNI needs to be configured to 20 for the TL 2. Similarly, on the TL 2, an outbound VNI needs to be configured to 10 for the TL 1. In this way, a layer 2 packet may be normally forwarded. An example in which the data center A sends a packet to the data center B is used. After receiving a VXLAN packet within the data center A, the TL 1 decapsulates the packet, and uses the outbound VNI 20 to perform VXLAN encapsulation on the packet before sending the packet to the TL 2. After receiving the packet, the TL 2 forwards the packet as a normal VXLAN packet.

Different from FIG. 9, for VXLAN mapping in mapping VNI mode shown in FIG. 10, a VNI used by the VXLAN tunnel in the data center B is 20, and a VNI mapping table, namely, a correspondence between a local VNI (10) and a mapping VNI (30) needs to be established on a TL 1. Similarly, a VNI mapping table, namely, a correspondence between a local VNI (20) and the mapping VNI (30) also needs to be established on a TL 2. In this way, a layer 2 packet may be normally forwarded. An example in which the data center A sends a packet to the data center B is used. After receiving a VXLAN packet within the data center A, the TL 1 decapsulates the packet, searched the VNI mapping table for the mapping VNI (30), and then uses the mapping VNI to perform VXLAN encapsulation on the packet before sending the packet to the TL 2. After receiving the packet, the TL 2 decapsulates the packet, searches the VNI mapping table for the local VNI (20), and then uses the local VNI to encapsulate the packet for internal forwarding.

Figure 11:
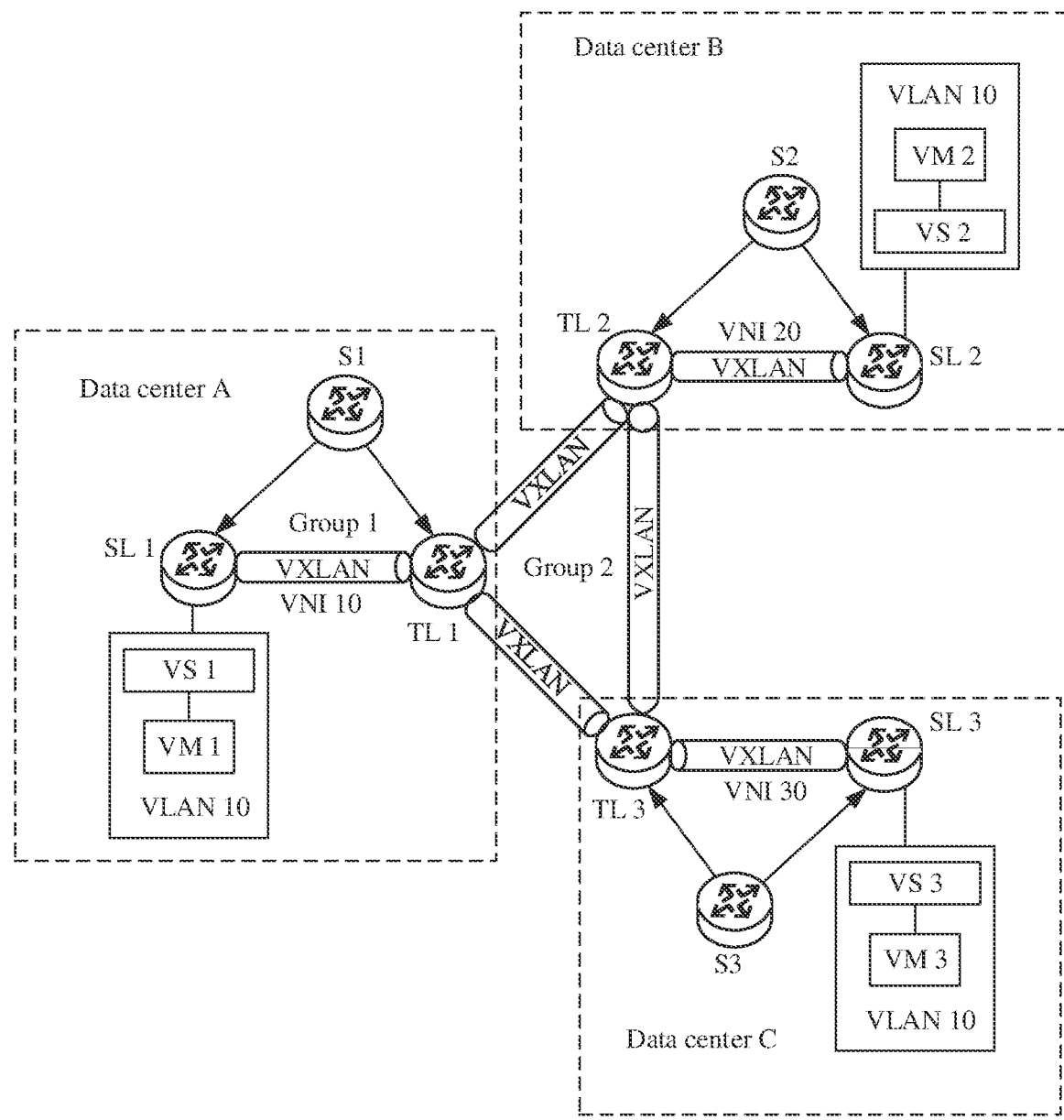
FIG. 11 is a schematic diagram of different split horizon groups.

The VXLAN tunnels are isolated by default and do not forward packets to each other. As shown in FIG. 11, a VXLAN tunnel facing a DC side may be added to a split horizon group 1, and a tunnel facing a WAN side (namely, a DCI side) may be added to a split horizon group 2. After receiving traffic from a VXLAN tunnel, a transmission device in a data center forwards the traffic to a VXLAN tunnel in another split horizon group, but not to a tunnel in a same split horizon group. In other words, tunnels in a same split horizon group cannot communicate with each other, but tunnels in different split horizon groups can communicate with each other.

A specific process of transmitting traffic by the transmission device TL 2 in the data center B is as follows:

(1) After receiving BUM traffic from the VXLAN tunnel on the DC side, the TL 2 decapsulates the VXLAN packet to obtain the VNI 20, searches an ingress replication table based on the VNI 20, and obtains a list of remote VTEP addresses that belong to a same VNI.

The TL 2 may obtain VTEP addresses of the TL 1, a TL 3, and an SL 2 based on the remote VTEP address list, and then may determine, based on the VTEP addresses of the devices, whether the devices are located in the group 1 or the group 2. For a device located in the group 1, the TL 2 does not forward the traffic. For a device located in the group 1, the TL 2 forwards the traffic.

(2) The TL 2 obtains a split horizon group attribute of a source VNI PEER tunnel. Another SL in the DC belongs to the same split horizon group, so that the BUM traffic is not replicated to the another SL in the DC. A WAN-side TL belongs to another split horizon group, so that the BUM traffic is forwarded to the WAN-side TL device. A tunnel destination is the TL 1, and a VNI is VNI 10 bound to a BD on the TL 1.

(3) After receiving the BUM traffic sent by the TL 2, the TL 1/TL 3 obtains the split horizon group attribute of the source VNIPEER tunnel. The WAN-side TL belongs to the same split horizon group, so that the BUM traffic is not sent to the WAN-side TL device. The SL in the DC belongs to another split horizon group, so that the BUM traffic is forwarded to the SL in the DC. A tunnel destination is an SL 1/SL 3, and a carried VNI is a VNI bound to the BD on the SL.

(4) After receiving the BUM traffic sent by the TL 1/TL 3, the SL 1/SL 3 decapsulates the VXLAN packet to obtain the VNI, finds the BD based on the VNI, obtains a layer 2 sub-interface in the BD, and broadcasts the packet to an access-side interface in the BD.

Figure 13:
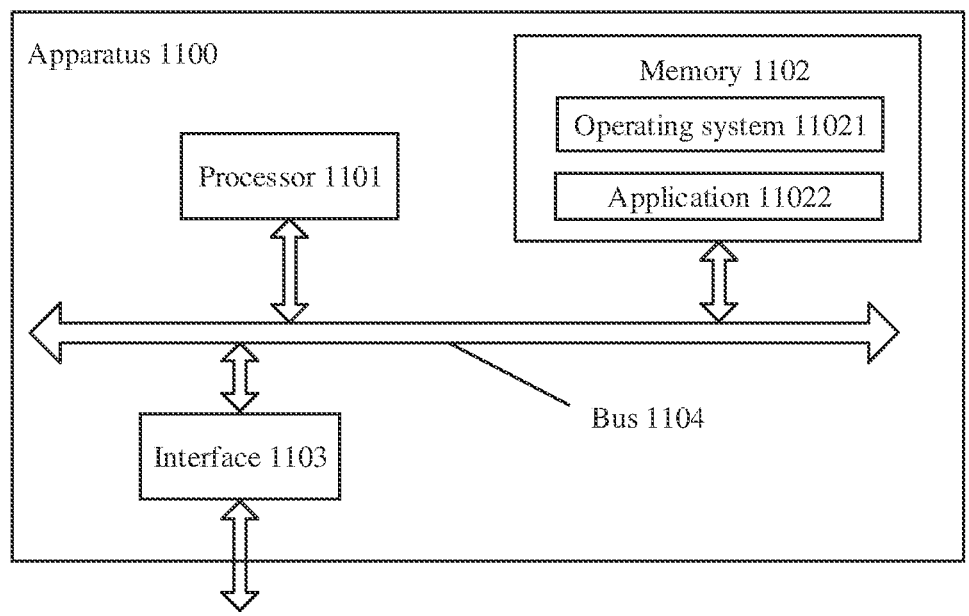
FIG. 13 is a schematic diagram of a hardware structure of a packet transmission apparatus according to an embodiment of this application.
Figure 14:
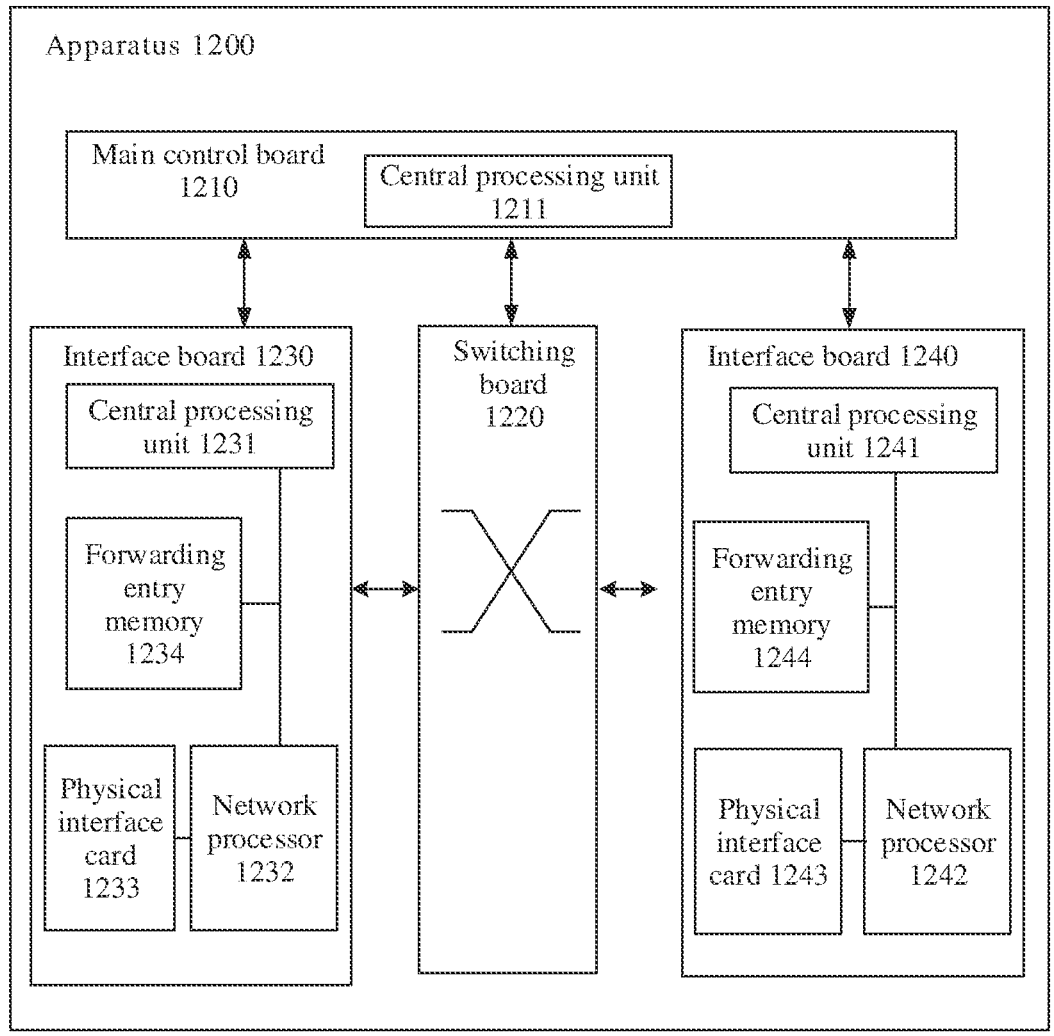
FIG. 14 is a schematic diagram of a hardware structure of a packet transmission apparatus according to an embodiment of this application.

The packet transmission method in the embodiments of this application is described above in detail with reference to FIG. 1 to FIG. 11. The following describes in detail packet transmission apparatuses in the embodiments of this application with reference to FIG. 12 to FIG. 14. It should be understood that the packet transmission apparatuses shown in FIG. 12 to FIG. 14 can perform the packet transmission method in the embodiments of this application. For brevity, when the packet transmission apparatuses shown in FIG. 12 to FIG. 14 are described below, repeated descriptions are properly omitted.

Figure 12:
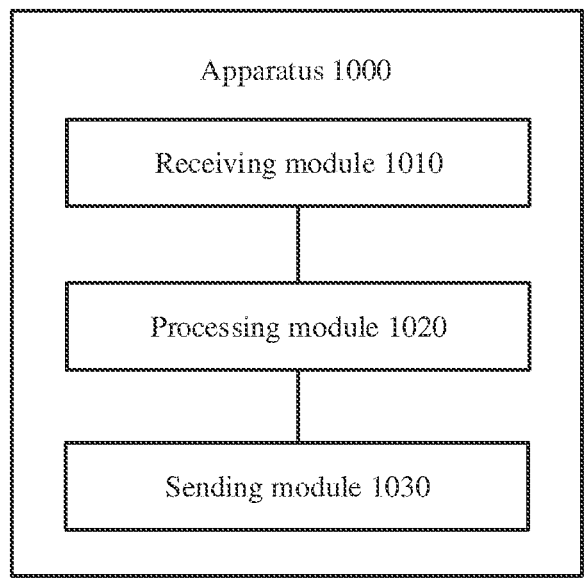
FIG. 12 is a schematic block diagram of a packet transmission apparatus according to an embodiment of this application.

FIG. 12 is a schematic block diagram of a packet transmission apparatus according to an embodiment of this application. An apparatus moo shown in FIG. 12 includes:

a receiving module 1010, configured to receive a first VXLAN packet sent by a first service device through a first VXLAN tunnel, where the first VXLAN packet includes a first VXLAN network identifier VNI, the first VNI indicates that a broadcast domain BD to which the first VXLAN packet sent by the first service device through the first VXLAN tunnel belongs is a first BD, and the first transmission device and the first service device are located in a first data center DC;

a processing module 1020, configured to determine first egress information corresponding to the first BD and a first destination MAC address, based on a correspondence between the first BD, the first destination MAC address, and the first egress information, where the first destination MAC address indicates a destination address of an Ethernet frame included in the first VXLAN packet, and the first egress information includes a first virtual extensible local area network tunnel end point VTEP address and a second VNI, where the processing module 1020 is further configured to generate a second VXLAN packet based on the first VXLAN packet and the first egress information, where the second VXLAN packet includes the second VNI and the Ethernet frame; and a sending module 1030, configured to send the second VXLAN packet to a second transmission device through a second VXLAN tunnel, where the second transmission device is located in a second DC, the second DC is different from the first DC, the first VTEP address indicates a port through which the second transmission device connects to the second VXLAN tunnel, and the second VNI indicates that a BD to which the second VXLAN packet sent by the first transmission device through the second VXLAN tunnel belongs is a second BD.

Optionally, in an embodiment, the second VNI is the same as a third VNI. The third VNI is a VNI included in a third VXLAN packet sent by the second transmission device to a second service device through a third VXLAN tunnel. The third VXLAN packet is generated by the second transmission device based on the second VXLAN packet. The second transmission device and the second service device are located in the second DC.

Optionally, in an embodiment, the second VNI is different from a third VNI. The third VNI is a VNI included in a third VXLAN packet sent by the second transmission device to a second service device through a third VXLAN tunnel. The third VXLAN packet is generated by the second transmission device based on the second VXLAN packet. The second transmission device and the second service device are located in the second DC.

Optionally, in an embodiment, the receiving module 1010 is further configured to receive a first media access control MAC/internet protocol address IP advertisement route sent by the second transmission device, and the first MAC/IP advertisement route includes the first destination MAC address and the second VNI; and the processing module 1020 is further configured to generate the correspondence between the first BD, the first destination MAC address, and the first egress information based on the first MAC/IP advertisement route.

Optionally, in an embodiment, the sending module 1030 is further configured to send a second MAC/IP advertisement route to the first service device. The second MAC/IP advertisement route includes the first destination MAC address and the first VNI.

Optionally, in an embodiment, the receiving module 1010 is further configured to receive a first route that is sent by the first service device and that is reflected by a first route reflector RR and that is used to establish the first VXLAN tunnel, and the first RR is located in the first DC; the processing module 1020 is further configured to add the first VXLAN tunnel to a first split horizon group, and the first split horizon group is a split horizon group in the first DC; the receiving module 1010 is further configured to receive a second route that is sent by the second transmission device and that is reflected by a second route reflector RR and that is used to establish the second VXLAN tunnel, and the second RR is located outside the first DC; and the processing unit 1020 is further configured to add the second VXLAN tunnel to a second split horizon group, and the second split horizon group is a split horizon group outside the first DC.

Optionally, in an embodiment, the processing module 1020 is configured to determine, based on the first VTEP address, that the second transmission device is located in the second DC.

FIG. 13 is a schematic diagram of a hardware structure of a packet transmission apparatus 1100 according to an embodiment of this application. The packet transmission apparatus 1100 shown in FIG. 13 may perform the steps in the packet transmission method in the embodiments of this application.

As shown in FIG. 13, the packet transmission apparatus 1100 includes a processor 1101, a memory 1102, an interface 1103, and a bus 1104. The interface 1103 may be implemented in a wireless or wired manner, and may be a network adapter. The processor 1101, the memory 1102, and the interface 1103 are connected through the bus 1104.

The interface 1103 may include a transmitter and a receiver, configured to send and receive a VXLAN packet to and from a first service device and a second transmission device. For example, the interface 1103 may perform step 101 and step 104.

The processor 1101 is configured to generate a new VXLAN packet. For example, the processor 1101 is configured to perform step 102 and step 103, to generate a second VXLAN packet.

The memory 1102 includes an operating system 11021 and an application 11022, and is configured to store a program, code, or an instruction. When executing the program, the code, or the instruction, a processor or a hardware device may complete a packet transmission process in the embodiments of this application.

Optionally, the memory 1102 may include a read-only memory (ROM) and a random access memory (RAM). The ROM includes a basic input/output system (BIOS) or an embedded system, and the RAM includes an application and an operating system. When the packet transmission apparatus 1100 needs to run, the BIOS or the embedded system that is built into the ROM is used to start a system, and lead the packet transmission apparatus 1100 to enter a normal running state. After entering the normal running state, the packet transmission apparatus 1100 runs the application and the operating system in the RAM, to complete a processing process related to the packet transmission apparatus in the method embodiment.

It may be understood that FIG. 13 shows only a simplified design of the packet transmission apparatus. In actual application, the packet transmission apparatus may include any quantity of interfaces, processors, or memories. The second transmission device mentioned in this embodiment of this application also has a same function as the packet transmission apparatus. Details are not described herein again.

FIG. 14 is a schematic diagram of a hardware structure of a packet transmission apparatus according to an embodiment of this application. The packet transmission apparatus 1200 shown in FIG. 14 may perform the steps in the packet transmission method in the embodiments of this application.

As shown in FIG. 14, the packet transmission apparatus 1200 includes a main control board 1210, an interface board 1230, a switching board 1220, and an interface board 1240. The main control board 1210 is configured to complete functions such as system management, device maintenance, and protocol processing. The switching board 1220 is configured to complete data exchange between interface boards (an interface board is also referred to as a line card or a service board). The interface boards 1230 and 1240 are configured to provide various service interfaces (for example, a POS interface, a GE interface, and an ATM interface), and forward a data packet. The main control board 1210, the interface boards 1230 and 1240, and the switching board 1220 are connected to a system backboard by using a system bus for communication. A central processing unit 1231 on the interface board 1230 is configured to control and manage the interface board, and communicate with a central processing unit on a main control board.

A physical interface card 1233 on the interface board 1230 is configured to receive a first VXLAN packet sent by a first service device through a VXLAN tunnel, and transmit the first VXLAN packet to a central processing unit 1211 on the main control board 1210 through the central processing unit 1231 on the interface board 1230.

The central processing unit 1211 on the main control board 1210 is configured to determine first egress information corresponding to the first BD and a first destination MAC address, based on a correspondence between the first BD, the first destination MAC address, and the first egress information, where the first destination MAC address indicates a destination address of an Ethernet frame included in the first VXLAN packet, and the first egress information includes a first virtual extensible local area network tunnel end point VTEP address and a second VNI.

The central processing unit 1211 on the main control board 1210 is further configured to generate a second VXLAN packet based on the first VXLAN packet and the first egress information, where the second VXLAN packet includes the second VNI and the Ethernet frame.

The physical interface card 1233 on the interface board 1230 is further configured to: receive a first MAC/IP advertisement route sent by the second transmission device, where the first MAC/IP advertisement route includes the first destination MAC address and the second VNI, and transmit the first MAC/IP advertisement route to the central processing unit 1211 on the main control board 1210 through the central processing unit 1231 on the interface board 1230.

The central processing unit 1211 on the main control board 1210 is further configured to obtain, from the physical interface card 1233 on the interface board 1230, the first MAC/IP advertisement route sent by the second transmission device, and generate the correspondence between the first BD, the first destination MAC address, and the first egress information, based on the first MAC/IP advertisement route.

A forwarding entry memory 1234 on the interface board 1230 is configured to store the correspondence between the first BD, the first destination MAC address, and the first egress information.

It should be understood that operations on the interface board 1240 are consistent with the operations on the interface board 1230 in this embodiment of the present application. For brevity, details are not described again.

In addition, it should be noted that there may be one or more main control boards. When there are a plurality of main control boards, a primary main control board and a secondary main control board may be included. There may be one or more interface boards, and a packet transmission apparatus with a stronger data processing capability provides more interface boards. There may also be one or more physical interface cards on the interface board. There may be no switching board or one or more switching boards. When there are a plurality of switching boards, load sharing and redundancy backup may be implemented together. In a centralized forwarding architecture, a packet transmission apparatus may need no switching board, and an interface board implements a service data processing function of the entire system. In a distributed forwarding architecture, a packet transmission apparatus may have at least one switching board, and exchange data between a plurality of interface boards by using the switching board, to provide a large-capacity data exchange and processing capability. Therefore, a data access and processing capability of the packet transmission apparatus in the distributed architecture is better than that of a device in the centralized architecture. Which architecture is used depends on a specific networking deployment scenario, and is not limited herein.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A packet transmission method, comprising:
receiving, by a first transmission device, a first virtual extensible local area network (VXLAN) packet sent by a first service device through a first VXLAN tunnel, wherein the first VXLAN packet comprises a first VXLAN network identifier (VNI), the first VNI indicates that a broadcast domain (BD) to which the first VXLAN packet sent by the first service device through the first VXLAN tunnel belongs is a first BD, and the first transmission device and the first service device are located in a first data center (DC);
determining, by the first transmission device, first egress information corresponding to the first BD and a first destination media access control (MAC) address, based on a correspondence between the first BD, the first destination MAC address, and the first egress information, wherein the first destination MAC address indicates a destination address of an Ethernet frame contained in the first VXLAN packet, and the first egress information comprises a first virtual extensible local area network tunnel end point (VTEP) address and a second VNI;
generating, by the first transmission device, a second VXLAN packet based on the first VXLAN packet and the first egress information, wherein the second VXLAN packet comprises the second VNI and the Ethernet frame; and
sending, by the first transmission device, the second VXLAN packet to a second transmission device through a second VXLAN tunnel, wherein the second transmission device is located in a second DC, the second DC is different from the first DC, the first VTEP address indicates an address through which the second transmission device connects to the second VXLAN tunnel, and the second VNI indicates that a BD to which the second VXLAN packet sent by the first transmission device through the second VXLAN tunnel belongs is a second BD.

2. The method according to claim 1, wherein the second VNI is the same as a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

3. The method according to claim 1, wherein the second VNI is different from a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

4. The method according to claim 2, wherein the method further comprises:

receiving, by the first transmission device, a first MAC/internet protocol (IP) advertisement route sent by the second transmission device, wherein the first MAC/IP advertisement route comprises the first destination MAC address and the second VNI; and
generating, by the first transmission device, the correspondence between the first BD, the first destination MAC address, and the first egress information, based on the first MAC/IP advertisement route.

5. The method according to claim 4, wherein the method further comprises:
sending, by the first transmission device, a second MAC/IP advertisement route to the first service device, wherein the second MAC/IP advertisement route comprises the first destination MAC address and the first VNI.

6. The method according to claim 1, wherein the method further comprises:
receiving, by the first transmission device, a first route that is sent by the first service device and that is reflected by a first route reflector (RR) and that is used to establish the first VXLAN tunnel, wherein the first RR is located in the first DC;
adding, by the first transmission device, the first VXLAN tunnel to a first split horizon group, wherein the first split horizon group is a split horizon group in the first DC;
receiving, by the first transmission device, a second route that is sent by the second transmission device and that is reflected by a second RR, and that is used to establish the second VXLAN tunnel, wherein the second RR is located outside the first DC; and
adding, by the first transmission device, the second VXLAN tunnel to a second split horizon group, wherein the second split horizon group is outside the first DC.

7. The method according to claim 1, wherein the method further comprises:
determining, by the first transmission device based on the first VTEP address, that the second transmission device is located in the second DC.

8. A packet transmission apparatus, comprising:
a memory, wherein the memory comprises instructions; and
a processor configured to communicate with the memory, wherein the processor is configured to execute the instructions to:
receive a first virtual extensible local area network (VXLAN) packet sent by a first service device through a first VXLAN tunnel, wherein the first VXLAN packet comprises a first VXLAN network identifier (VNI), the first VNI indicates that a broadcast domain (BD) to which the first VXLAN packet sent by the first service device through the first VXLAN tunnel belongs is a first BD, and the packet transmission apparatus and the first service device are located in a first data center (DC);
determine first egress information corresponding to the first BD and a first destination media access control, MAC, address, based on a correspondence between the first BD, the first destination MAC address, and the first egress information, wherein the first destination MAC address indicates a destination address of an Ethernet frame contained in the first VXLAN packet, and the first egress information comprises a first virtual extensible local area network tunnel end point (VTEP) address and a second VNI, wherein generate a second VXLAN packet based on the first VXLAN packet and the first egress information, wherein the second VXLAN packet comprises the second VNI and the Ethernet frame; and send the second VXLAN packet to a second transmission device through a second VXLAN tunnel, wherein the second transmission device is located in a second DC, the first VTEP address indicates an address through which the second transmission device connects to the second VXLAN tunnel, and the second VNI indicates that a BD to which the second VXLAN packet sent by the packet transmission apparatus through the second VXLAN tunnel belongs is a second BD.

9. The apparatus according to claim 8, wherein the second VNI is the same as a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

10. The apparatus according to claim 8, wherein the second VNI is different from a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

11. The apparatus according to claim 9, wherein the processor is further configured to execute the instructions to:
receive a first media access control MAC/internet protocol (IP) advertisement route sent by the second transmission device, wherein the first MAC/IP advertisement route comprises the first destination MAC address and the second VNI; and
generate the correspondence between the first BD, the first destination MAC address, and the first egress information, based on the first MAC/IP advertisement route.

12. The apparatus according to claim 11, wherein the processor is further configured to execute the instructions to:
send a second MAC/IP advertisement route to the first service device, wherein the second MAC/IP advertisement route comprises the first destination MAC address and the first VNI.

13. The apparatus according to claim 8, wherein the processor is further configured to execute the instructions to:
receive a first route that is sent by the first service device and that is reflected by a first route reflector (RR) and that is used to establish the first VXLAN tunnel, wherein the first RR is located in the first DC;
add the first VXLAN tunnel to a first split horizon group, wherein the first split horizon group is a split horizon group in the first DC;
receive a second route that is sent by the second transmission device and that is reflected by a second RR and that is used to establish the second VXLAN tunnel, wherein the second RR is located outside the first DC; and
add the second VXLAN tunnel to a second split horizon group, wherein the second split horizon group is outside the first DC.

14. The apparatus according to claim 8, wherein the processor is further configured to execute the instructions to:

determine, based on the first VTEP address, that the second transmission device is located in the second DC.

15. A non-transitory computer-readable storage medium, comprising instructions which, when executed by a computer, cause the computer to carry out the instructions to:
receive a first virtual extensible local area network (VXLAN) packet sent by a first service device through a first VXLAN tunnel, wherein the first VXLAN packet comprises a first VXLAN network identifier (VNI), the first VNI indicates that a broadcast domain (BD) to which the first VXLAN packet sent by the first service device through the first VXLAN tunnel belongs is a first BD, and the computer and the first service device are located in a first data center (DC);
determine first egress information corresponding to the first BD and a first destination media access control, MAC, address, based on a correspondence between the first BD, the first destination MAC address, and the first egress information, wherein the first destination MAC address indicates a destination address of an Ethernet frame contained in the first VXLAN packet, and the first egress information comprises a first virtual extensible local area network tunnel end point (VTEP) address and a second VNI;
generate a second VXLAN packet based on the first VXLAN packet and the first egress information, wherein the second VXLAN packet comprises the second VNI and the Ethernet frame; and
send the second VXLAN packet to a second transmission device through a second VXLAN tunnel, wherein the second transmission device is located in a second DC, the first VTEP address indicates an address through which the second transmission device connects to the second VXLAN tunnel, and the second VNI indicates that a BD to which the second VXLAN packet sent by the computer through the second VXLAN tunnel belongs is a second BD.

16. The non-transitory computer-readable storage medium according to claim 15, wherein the second VNI is the same as a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

17. The non-transitory computer-readable storage medium according to claim 15, wherein the second VNI is different from a third VNI, the third VNI is contained in a third VXLAN packet sent by the second transmission device to a second service device through a third VXLAN tunnel, the third VXLAN packet is generated by the second transmission device based on the second VXLAN packet, and the second transmission device and the second service device are located in the second DC.

18. The non-transitory computer-readable storage medium according to claim 16, wherein the instructions, when executed by the computer, cause the computer to carry out the instructions to:
receive a first media access control MAC/internet protocol (IP) advertisement route sent by the second transmission device, wherein the first MAC/IP advertisement route comprises the first destination MAC address and the second VNI; and generate the correspondence between the first BD, the first destination MAC address, and the first egress information, based on the first MAC/IP advertisement route.

19. The non-transitory computer-readable storage medium according to claim 18, wherein the instructions, when executed by the computer, cause the computer to carry out the instructions to:
send a second MAC/IP advertisement route to the first service device, wherein the second MAC/IP advertisement route comprises the first destination MAC address and the first VNI.

20. The non-transitory computer-readable storage medium according to claim 18, wherein the instructions, when executed by the computer, cause the computer to carry out the instructions to:
receive a first route that is sent by the first service device and that is reflected by a first route reflector (RR) and that is used to establish the first VXLAN tunnel, wherein the first RR is located in the first DC;
add the first VXLAN tunnel to a first split horizon group, wherein the first split horizon group is a split horizon group in the first DC;
receive a second route that is sent by the second transmission device and that is reflected by a second RR and that is used to establish the second VXLAN tunnel, wherein the second RR is located outside the first DC; and
add the second VXLAN tunnel to a second split horizon group, wherein the second split horizon group is a outside the first DC.

* * * * *